(12) United States Patent
Akaishi et al.

(10) Patent No.: US 8,471,507 B2
(45) Date of Patent: Jun. 25, 2013

(54) ELECTRIC POWER CONVERSION SYSTEM AND ELECTRIC POWER CONVERSION DEVICE

(75) Inventors: Yoshio Akaishi, Hitachinaka (JP); Yasuo Noto, Hitachinaka (JP); Koichi Yahata, Hitachinaka (JP); Hirokazu Matsui, Hitachiota (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 110 days.

(21) Appl. No.: 13/171,582

(22) Filed: Jun. 29, 2011

(65) Prior Publication Data

US 2012/0001574 A1 Jan. 5, 2012

(30) Foreign Application Priority Data

Jun. 30, 2010 (JP) ................. 2010-148470

(51) Int. Cl.
*H02P 6/14* (2006.01)
*H02M 5/40* (2006.01)

(52) U.S. Cl.
USPC .............. 318/400.04; 700/21; 700/30; 361/1; 361/10

(58) Field of Classification Search
USPC ................. 318/599, 801, 612, 623, 624, 628, 318/400.01–400.41; 361/1–10
See application file for complete search history.

(56) References Cited

U.S. PATENT DOCUMENTS

| | | | |
|---|---|---|---|
| 2002/0036911 A1* | 3/2002 | Okui | 363/95 |
| 2004/0100222 A1* | 5/2004 | Karikomi | 318/801 |
| 2007/0176577 A1* | 8/2007 | Kezobo et al. | 318/807 |
| 2008/0211450 A1* | 9/2008 | Yamada et al. | 318/801 |
| 2010/0118569 A1* | 5/2010 | Kono et al. | 363/34 |
| 2010/0273072 A1* | 10/2010 | Hasegawa et al. | 429/431 |

FOREIGN PATENT DOCUMENTS

| | | |
|---|---|---|
| JP | 2008-206337 A | 9/2008 |
| JP | 2009-131043 A | 6/2009 |
| WO | WO 2006/112033 A1 | 10/2006 |

OTHER PUBLICATIONS

T. Möller, "Evaluation and Design of Filters Using a Taylor Series Expansion." IEEE Transactions on Visualization and Computer Graphics, vol. 3, No. 2, pp. 184-199 Apr.-Jun. 1997.*

* cited by examiner

*Primary Examiner* — Eduardo Colon Santana
*Assistant Examiner* — Said Bouziane
(74) *Attorney, Agent, or Firm* — Crowell & Moring LLP

(57) ABSTRACT

According to the present invention, an electrical power conversion system includes: a motor; an inverter circuit that outputs three-phase (U-phase, V-phase, W-phase) alternating currents to the motor; a current sensor that detects each of the three-phase alternating currents; and a control circuit that controls the inverter circuit based on a torque command value and values detected by the current sensor, so that the three-phase alternating currents outputted from the inverter circuit are formed as sine waves; and wherein the control circuit includes: a current component extraction unit that, based on the values detected by the current sensor, for each phase, extracts current components superimposed upon each of three-phase alternating currents; and an AC current abnormality detection unit that detects abnormality of an AC current flowing to the motor, based on the phases of the current components for any two phases among the three-phase alternating currents.

9 Claims, 24 Drawing Sheets

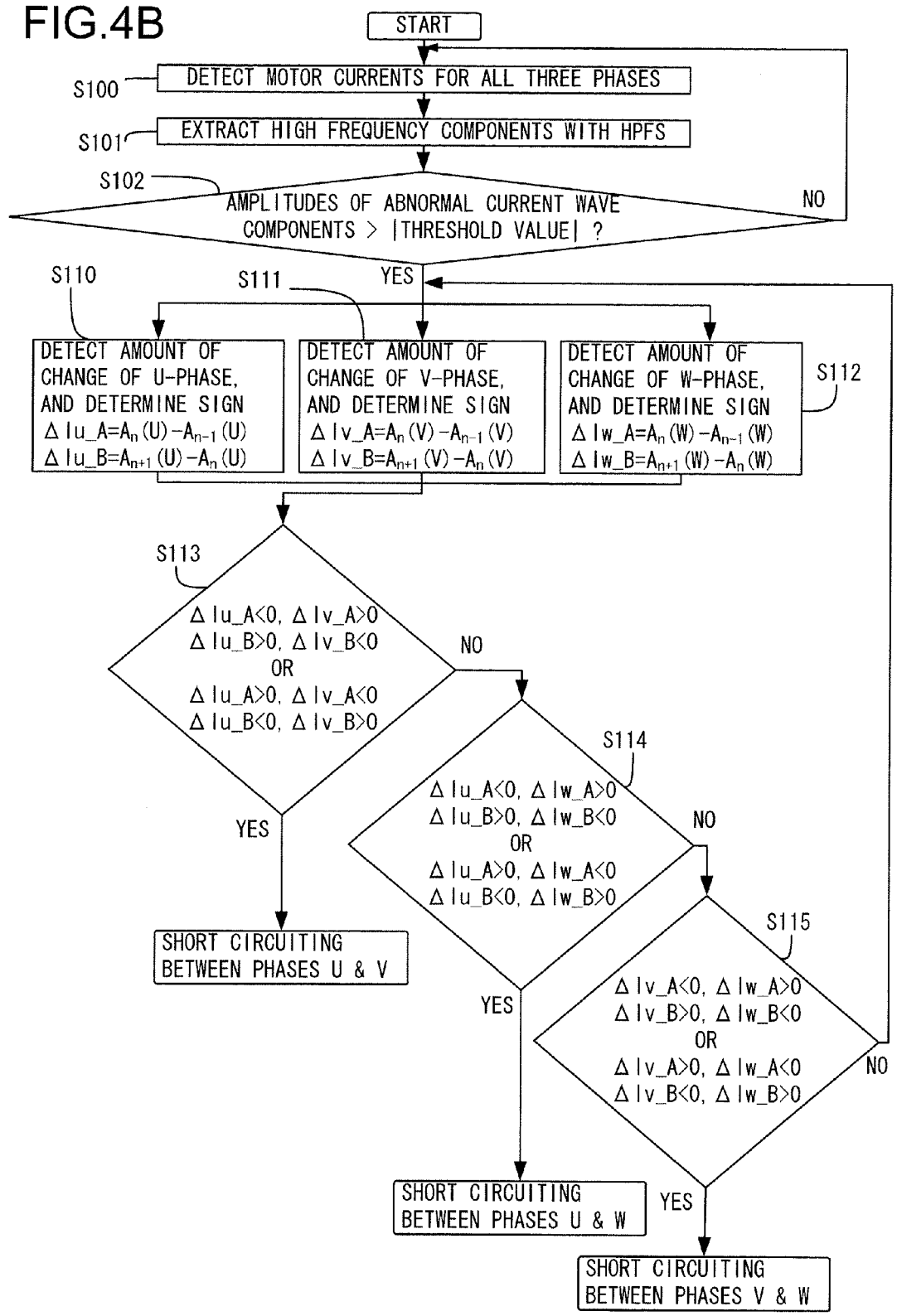

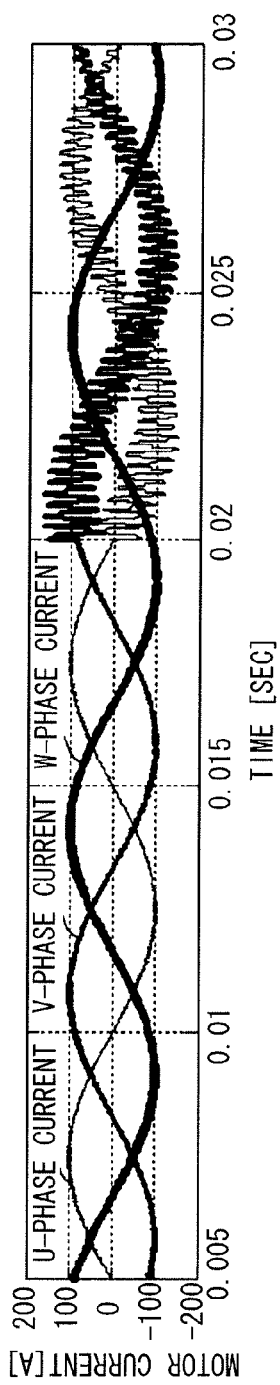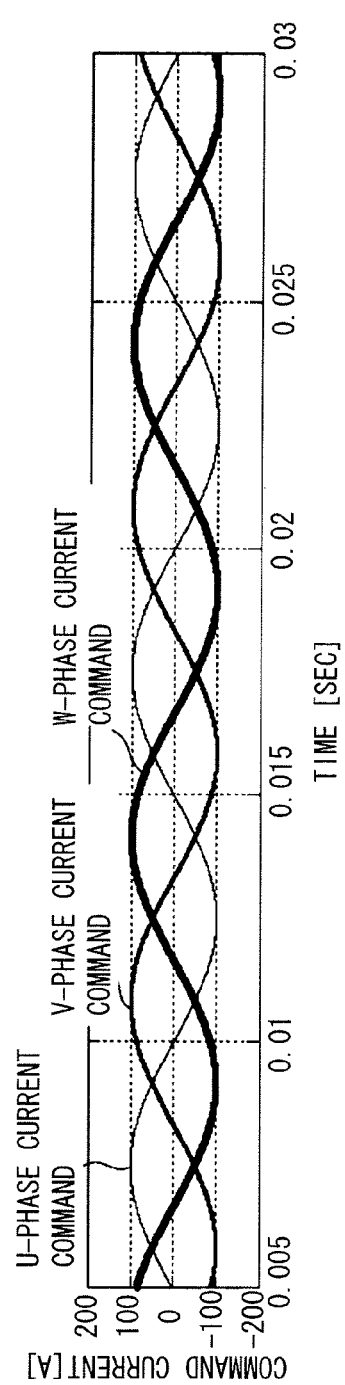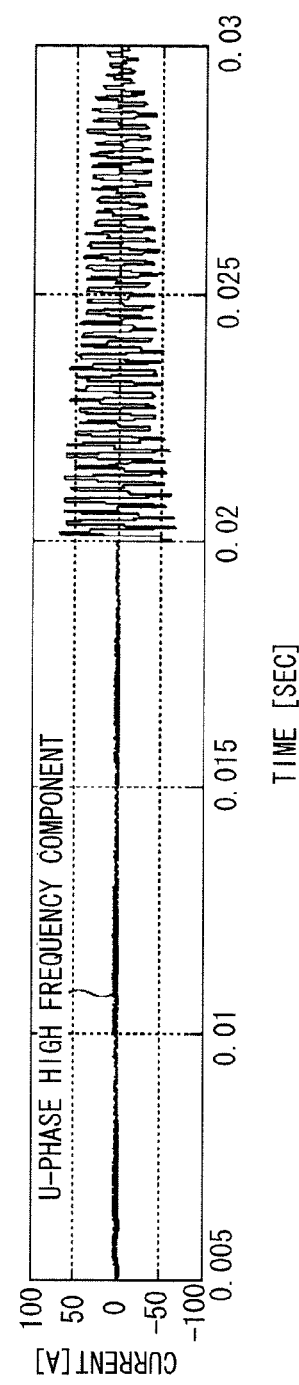

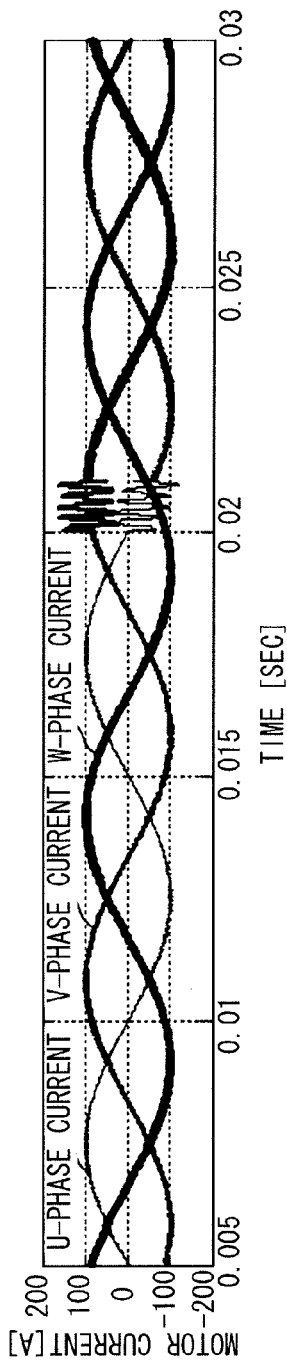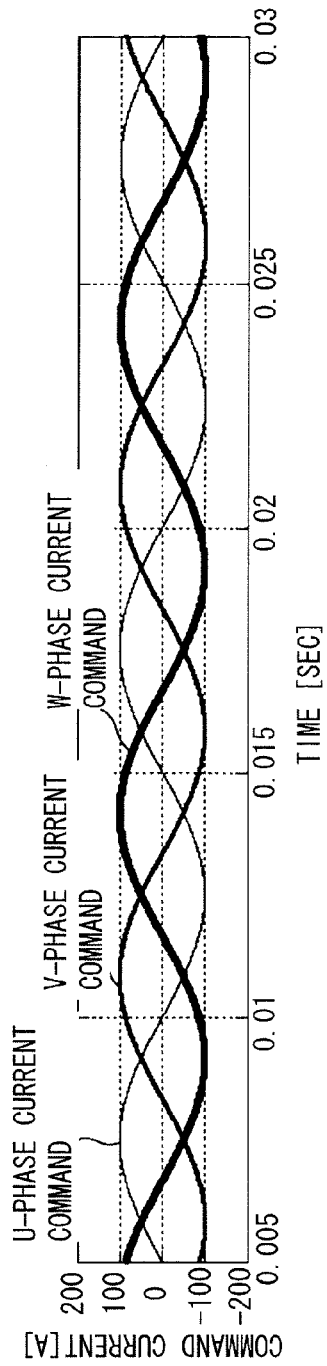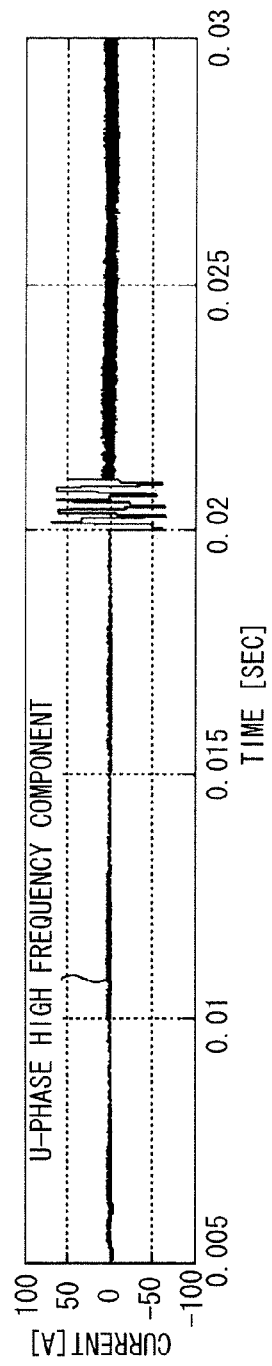
FIG.10A
FIG.10B
FIG.10C

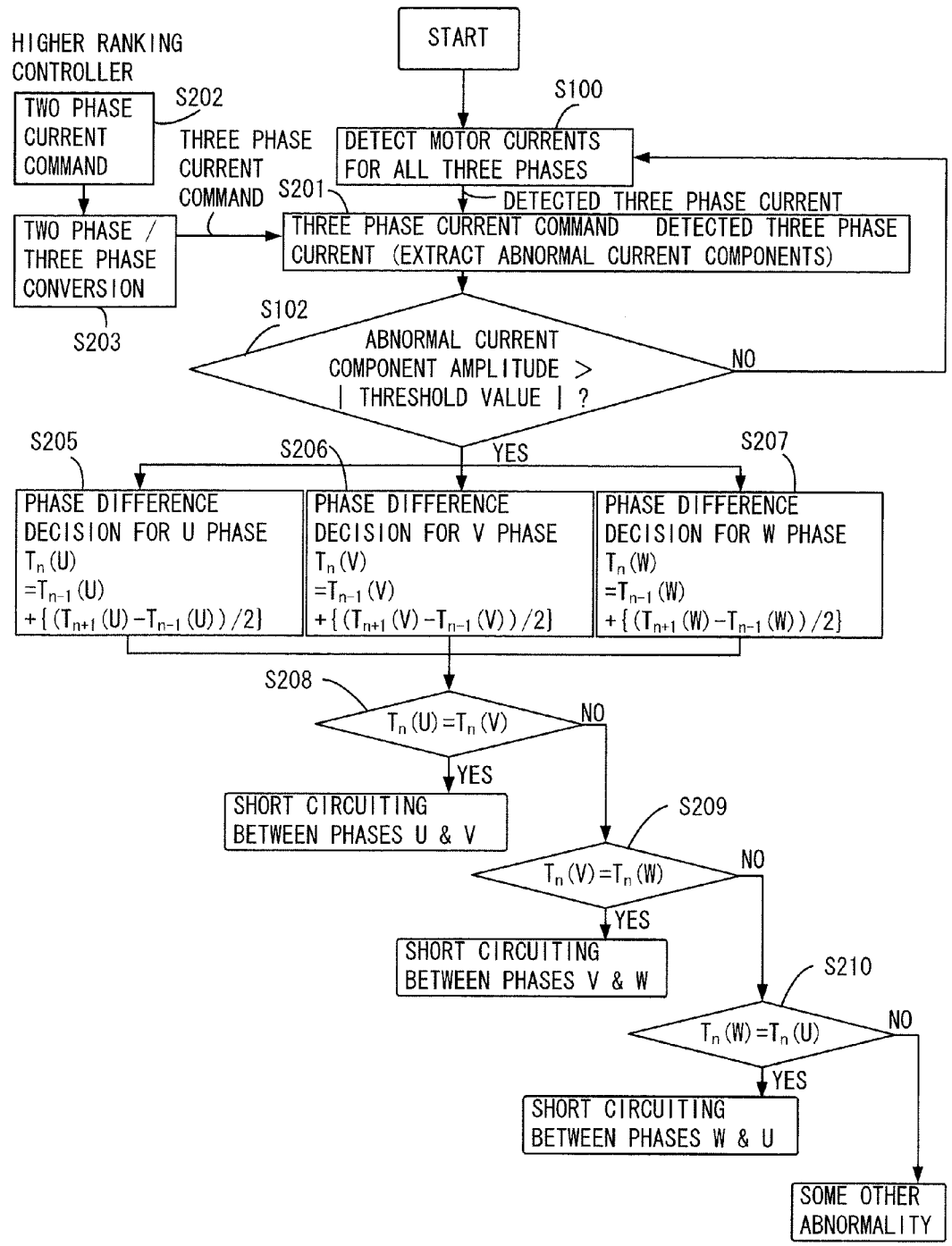

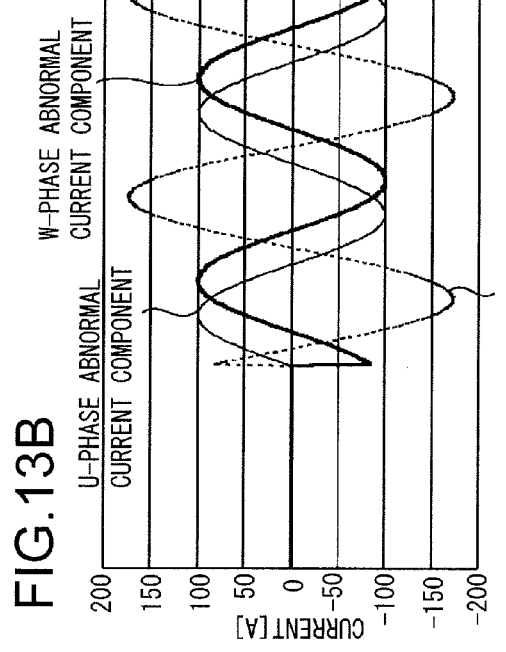
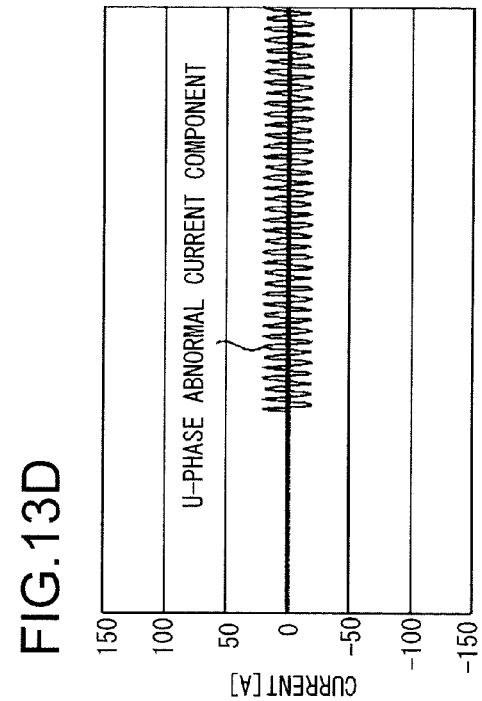
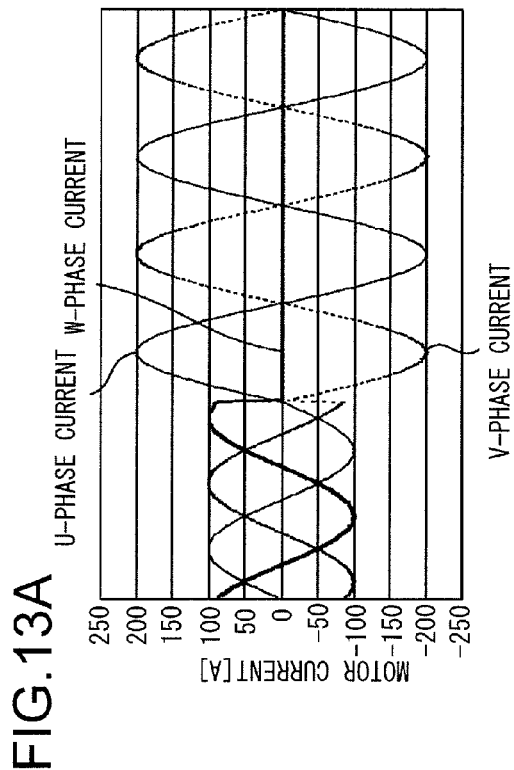
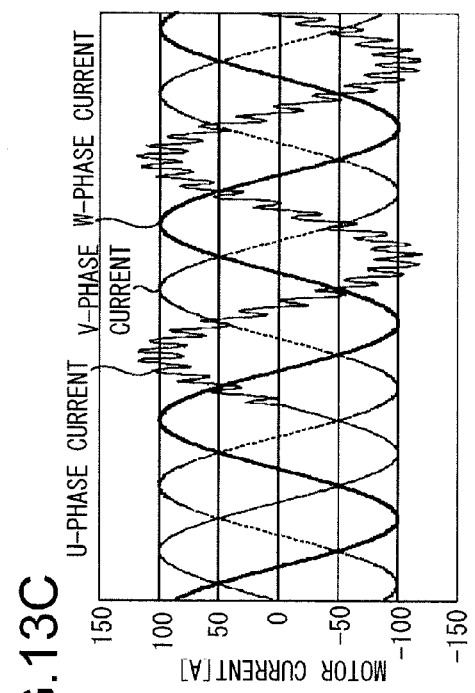

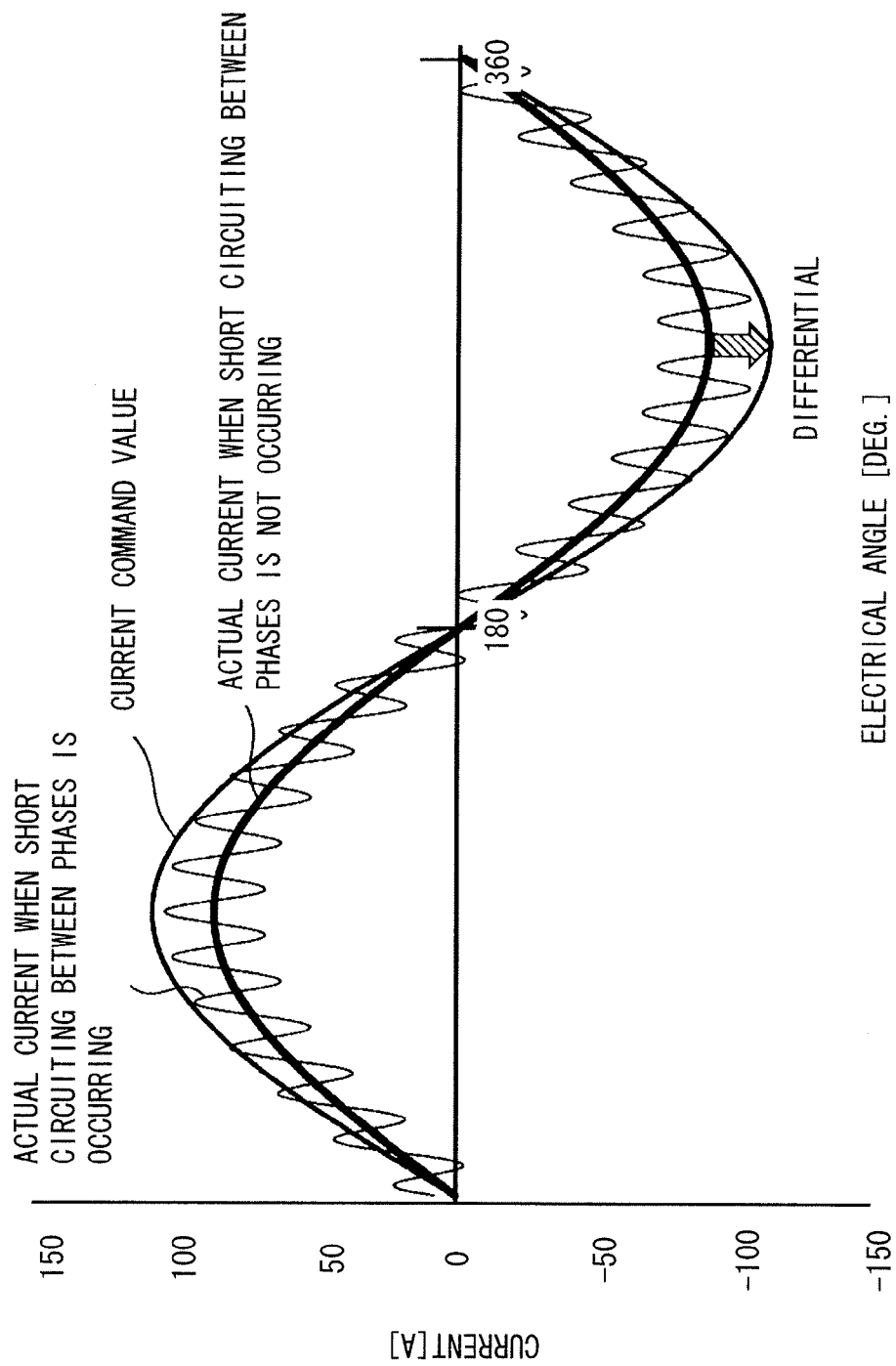

ELECTRIC POWER CONVERSION SYSTEM AND ELECTRIC POWER CONVERSION DEVICE

INCORPORATION BY REFERENCE

The disclosure of the following priority application is herein incorporated by reference: Japanese Patent Application No. 2010-148470, filed Jun. 30, 2010.

BACKGROUND OF THE INVENTION

1. Field of the Invention

The present invention relates to an electrical power conversion system and an electrical power conversion device, provided with an abnormality detection device for an inverter driven motor that detects abnormal current in the motor control circuit due to change of impedance and to change of the system; and in particular relates to an electrical power conversion system and an electrical power conversion device, provided with an abnormality detection device for an inverter driven motor that detects symptoms of short circuiting between the various phases.

2. Description of Related Art

From the past, methods have been known of detecting abnormality in a motor control circuit provided for an AC motor, in an inverter control device, and in motor cabling, and there have been techniques of detecting line breakage or short circuiting between phases from phase change of the currents or changes of frequency that occur during short circuiting. In Japanese Laid Open Patent Publication 2008-206337, for example, if the phase difference of the currents for two phases flowing in the lead lines that supply three phase electrical power changes from its value during normal conditions of 120° to 180°, then a decision means decides that a short circuit between those two phases has occurred. However, there is a demand for the reliability of abnormality detection for a motor to be further enhanced.

SUMMARY OF THE INVENTION

The problem for the present invention is to provide an electrical power conversion system and electrical power conversion device, with which yet further enhancement of the reliability can be anticipated.

According to the 1st aspect of the present invention, an electrical power conversion system, comprises: a motor; an inverter circuit that outputs a U-phase current, a V-phase current, and a W-phase current to the motor; a current sensor that detects the U-phase current, the V-phase current, and the W-phase current; and a control circuit that controls the inverter circuit based on a torque command value and values detected by the current sensor, so that the U phase current, the V-phase current, and the W-phase current outputted from the inverter circuit are formed as sine waves; and wherein the control circuit comprises: a current component extraction unit that, based on the values detected by the current sensor, for each phase, extracts current components superimposed upon the U-phase current, the V-phase current, and the W-phase current; and an AC current abnormality detection unit that detects abnormality of an AC current flowing to the motor, based on the phases of the current components for any two phases among the U-phase current, the V-phase current, and the W-phase current.

According to the 2nd aspect of the present invention, in an electrical power conversion system according to the 1st aspect, it is preferred that the current components are components of frequency higher than a fundamental frequency of the U-phase current, the V-phase current, and the W-phase current; and the current component extraction unit is a filter circuit that extracts the high frequency components.

According to the 3rd aspect of the present invention, in an electrical power conversion system according to the 1st aspect, it is preferred that the current components are components of frequency higher than a fundamental frequency of the U-phase current, the V-phase current, and the W-phase current; and the current component extraction unit extracts the high frequency components by taking the differences between the values detected by the current sensor, and three phase command currents that are calculated based on the torque command value.

According to the 4th aspect of the present invention, in an electrical power conversion system according to the 2nd aspect, it is preferred that the AC current abnormality detection unit determines that there is an abnormality in the AC current flowing to the motor, if an amplitude of any of the high frequency components is greater than or equal to a threshold value.

According to the 5th aspect of the present invention, in an electrical power conversion system according to the 2nd or 3rd aspect, it is preferred that the AC current abnormality detection unit determines that there is an abnormality, if a phase difference between any two phases of the high frequency components among the U-phase current, the V-phase current, and the W-phase current is approximately 180°.

According to the 6th aspect of the present invention, in an electrical power conversion system according to the 1st aspect, it is preferred that the control circuit comprises a current command generation unit that, based on the torque command value, generates a current command less than or equal to a maximum current command value; and the current command generation unit reduces the maximum current command value for the current command when it has been determined by the AC current abnormality detection unit that an abnormality has occurred.

According to the 7th aspect of the present invention, in an electrical power conversion system according to the 1st aspect, it is preferred that the control circuit comprises a current command generation unit that generates a current command based on the torque command value; and the current command generation unit stops generation of the current command when it has been determined by the AC current abnormality detection unit that an abnormality has occurred.

According to the 8th aspect of the present invention, in an electrical power conversion system according to the 1st aspect, it is preferred that the control circuit comprises a volatile memory whose stored contents disappear when supply of power is terminated, and a non volatile memory whose stored contents are preserved even when supply of power is terminated; the AC current abnormality detection unit outputs current information outputted to the motor to the volatile memory, and moreover outputs an abnormality signal to the volatile memory when it has been determined by the AC current abnormality detection unit that an abnormality has occurred; and contents stored in the volatile memory are outputted to the non volatile memory when the abnormality signal is inputted.

According to the 9th aspect of the present invention, in an electrical power conversion system according to the 4th aspect, it is preferred that the AC current abnormality detection unit increases the threshold value when a rate of change of the torque command value is greater than a predetermined value.

According to the 10th aspect of the present invention, in an electrical power conversion system according to the 4th aspect, it is preferred that the AC current abnormality detection unit increases the threshold value when the motor rotational speed is greater than a predetermined value.

According to the 11th aspect of the present invention, an electrical power conversion device comprises: an inverter circuit that outputs a U-phase current, a V-phase current, and a W-phase current to a motor; a current sensor that detects the U-phase current, the V-phase current, and the W-phase current; and a control circuit that controls the inverter circuit based on a torque command value and values detected by the current sensor, so that the U-phase current, the V-phase current, and the W-phase current outputted from the inverter circuit are formed as sine waves; wherein the control circuit comprises: a current component extraction unit that, based on the values detected by the current sensor, for each phase, extracts current components superimposed upon the U-phase current, the V-phase current, and the W-phase current; and an AC current abnormality detection unit that detects abnormality of an AC current flowing to the motor, based on the phases of the current components for any two phases among the U-phase current, the V-phase current, and the W-phase current.

According to the 12th aspect of the present invention, in an electrical power conversion device according to the 11th aspect, it is preferred that the current components are components of frequency higher than a fundamental frequency of the U-phase current, the V-phase current, and the W-phase current; and the current component extraction unit is a filter circuit that extracts the high frequency components.

According to the 13th aspect of the present invention, in an electrical power conversion device according to the 11th aspect, it is preferred that the current components are components of frequency higher than a fundamental frequency of the U-phase current, the V-phase current, and the W-phase current; and the current component extraction unit extracts the high frequency components by taking the differences between the values detected by the current sensor, and three phase command currents that are calculated based on the torque command value.

According to the 14th aspect of the present invention, in an electrical power conversion device according to the 12th aspect, it is preferred that the AC current abnormality detection unit determines that there is an abnormality in the AC current flowing to the motor, if an amplitude of any of the high frequency components is greater than or equal to a threshold value.

According to the 15th aspect of the present invention, in an electrical power conversion device according to the 12th aspect, it is preferred that the AC current abnormality detection unit determines that there is an abnormality, if a phase difference between any two phases of the high frequency components among the U-phase current, the V-phase current, and the W-phase current is approximately 180°.

BRIEF DESCRIPTION OF THE DRAWINGS

FIGS. 4A and 4B are flow charts each for explaining the processes of abnormality detection operation carried out in the electric power conversion system/electric power conversion device of according to the first embodiment of the present invention;
FIGS. 9A, 9B, 9C, 9D, and 9E are simulation results of abnormality detection simulation system shown in FIG. 8:
FIG. 9A shows the three phase inverter output current,
FIG. 9B shows the three phase motor current command value,
FIG. 9C shows the high frequency component of the U-phase current,
FIG. 9D shows the high frequency component of the V-phase current,
and FIG. 9E shows the high frequency component of the W-phase current;
FIGS. 10A, 10B, 10C, 10D, and 10E show simulation results of high frequency components of the waveforms of respective phases in FIGS. 9A through 9E, where the gain changeover of the current control system is applied when abnormality is detected;
FIG. 11 is a flow chart for explaining the process of abnormality detection operation carried out in the electric power conversion system/electric power conversion device of according to the second embodiment of the present invention;
FIGS. 13A, 13B, 13C, and 13D are current waveforms when an abnormality has occurred in the electric power conversion system/electric power conversion device according to the second embodiment of the present invention:
FIG. 13A is the motor current waveform during short circuiting between phases,
FIG. 13B is the extracted current component during short circuiting between phases,
FIG. 13C is the motor current waveform during short circuiting to the case,
and FIG. 13D is the extracted current component during short circuiting to the casing;
FIG. 15A is a figure showing a current waveform when the rate of change of a torque current command value is large, in a third embodiment employing the electric power conversion system/electric power conversion device according to the present invention.

DESCRIPTION OF THE PREFERRED EMBODIMENTS

Figure 1:
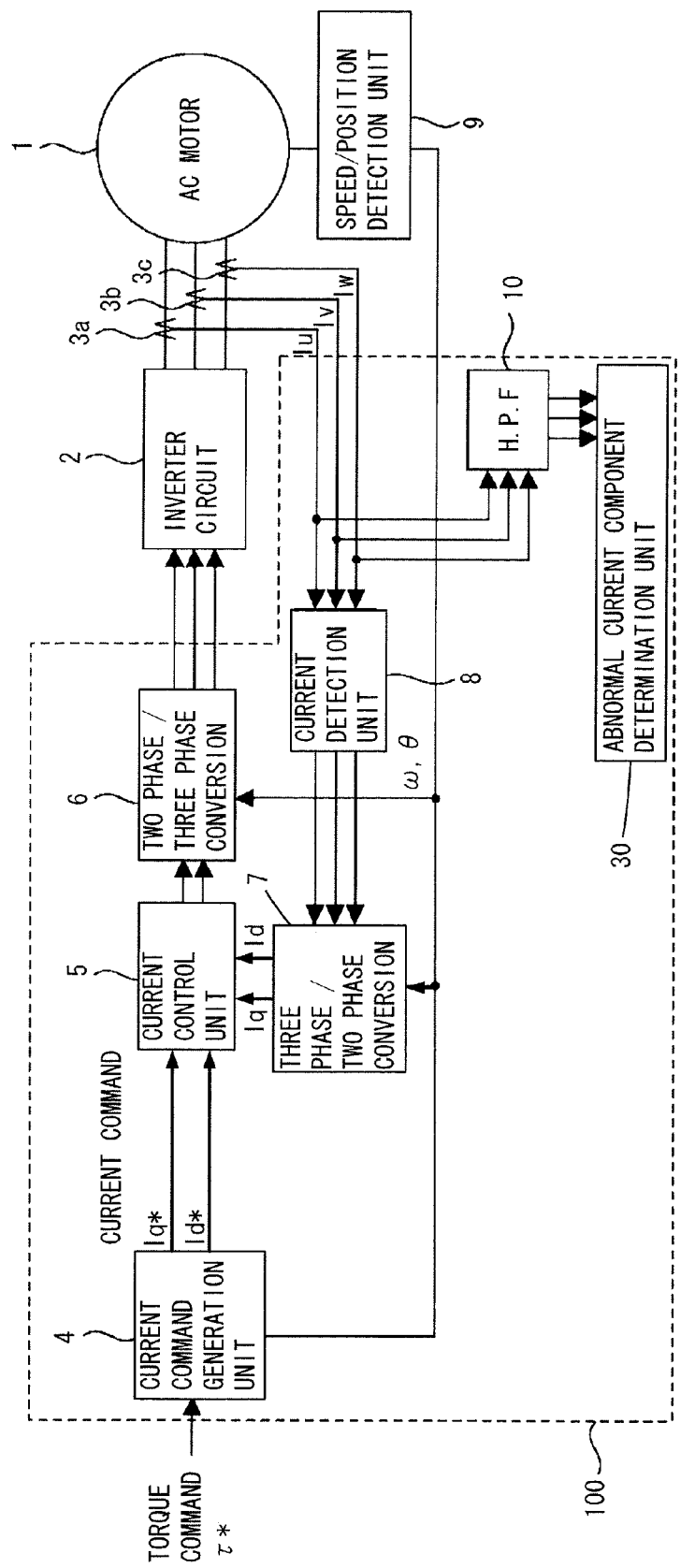
FIG. 1 is a schematic block diagram of a motor control circuit of a first embodiment of a electric power conversion system/electric power conversion device according to the present invention.

In the following, the exemplary embodiments of a electric power conversion system and electric power conversion device according to the present invention, referring to the FIGS. 1 through 22, will be explained.

First, the theory of the electrical power conversion system and of the electrical power conversion device according to the embodiments of the present invention will be explained in a simple manner. With a three phase AC motor, if a perfect short circuit occurs between two of the phases so that the phase of one or more of the current fundamental waves for those phases changes, or if the amplitude of a fundamental wave for one of the three phase currents changes greatly or the like, then this change of the phase or the current ratio between the fundamental waves of the three phase motor currents is detected and a protective operation is executed; but there is also a possibility that no abnormality will be detected during an initial short circuit or an insulation failure in which the change of current is small.

In particular, when the appearance of a situation is contemplated in which a phase difference of exactly 180° is present between the phases of the currents for two of the phases, so that a perfect short circuit is present between those two phases, the probability is extremely low that this type of short circuited state will actually occur suddenly during the operation of the motor control device. When the situation during actual usage of a motor control device is considered, it is deemed to be natural that the system will change gradually via an initial slightly short circuited state, in other words via an insulation failure, until full transition to short circuiting between phases has been completed. Moreover, even from the insulation-failed state, it is considered to be unlikely that a state of perfect short circuiting between phases will become established suddenly, since the current that flows in the AC motor is alternating current and changes from one moment to the next. Thus the possibility of sudden occurrence of a perfect short circuit between phases during actual usage of a motor is extremely unlikely; rather, if short circuiting between phases is to occur during actual operation of a motor, first an insulation-failed state becomes established, and then the degree of short circuiting progresses gradually.

However, abnormal loads continue to be imposed upon the switching elements of the inverter circuit until an abnormality is detected by the above operation, and there is a possibility that the switching elements may be destroyed before perfect short circuiting between phases has been detected. Thus, even supposing that protection is implemented by detecting perfect short circuiting between phases, there is still a fear that at this time point a very great load may already have been applied to the switching elements.

With the electrical power conversion system and the electrical power conversion device according to the embodiments of the present invention, a motor control device is supplied with which yet further enhancement of the reliability may be anticipated, since it is possible to determine the presence of an abnormality by detecting current components of the motor current fundamental wave other than its fundamental current component and then to adjust the gain of the current control system or to limit its output current, thus alleviating the load imposed upon the switching elements. The details will be explained in the following with reference to the drawings.

The First Embodiment

FIG. 1 is a control block diagram of a motor control device according to a first embodiment. An AC motor 1 is a permanent magnet type synchronous motor, and its rotational speed and magnetic pole position are detected by a rotation sensor such as a resolver or an encoder or the like. It should be understood that, since the abnormality detection method of the present invention is implemented by detecting high frequency components superimposed upon the three phase current, accordingly it would also be acceptable for the AC motor 1 to be, not an induction motor that is powered by three phase AC current, but rather an inductive load device that is driven by three phase AC.

The AC motor 1 is connected to an inverter circuit 2 via a cable, and thereby receives supply of electrical power. The inverter circuit 2 includes semiconductor switching elements such as IGBTs or the like, and performs conversion of electrical power by switching upper and lower arms for each phase with PWM signals. Current that is outputted from the inverter circuit 2 and flows to the AC motor 1 via the cable is detected by current sensors 3a through 3c. The inverter output current values detected by these current sensors 3a through 3c are sampled by a current detection unit 8 that provides an A/D conversion function to a micro computer (hereinafter termed a "microcomputer") that is equipped in the control circuit 100 (not shown in the figure).

A current command is generated by a current command generation unit 4 on the basis of a torque command value τ* from a higher ranking controller and the rotational speed and the magnetic pole position of the AC motor 1 as detected by a speed/position detection unit 9. And this current command value that has been generated is controlled by a current control unit 5, using a two phase current feedback value that has been converted by a three phase/two phase converter 7 from the motor current value detected by the current detection unit 8.

In the abnormality detection method of this first embodiment, detection of an abnormal current component and determination of abnormality are performed by providing a differential circuit or the like for the motor current values detected by the current sensors 3a through 3c, and by extracting high frequency components of higher frequency than the fundamental frequency of the inverter output current via a high pass filter 10 (hereinafter termed an "HPF"). It should be understood that it would also be acceptable to perform the extraction of high frequency components superimposed upon the fundamental wave of the inverter output current by using a band pass filter.

Figure 2:
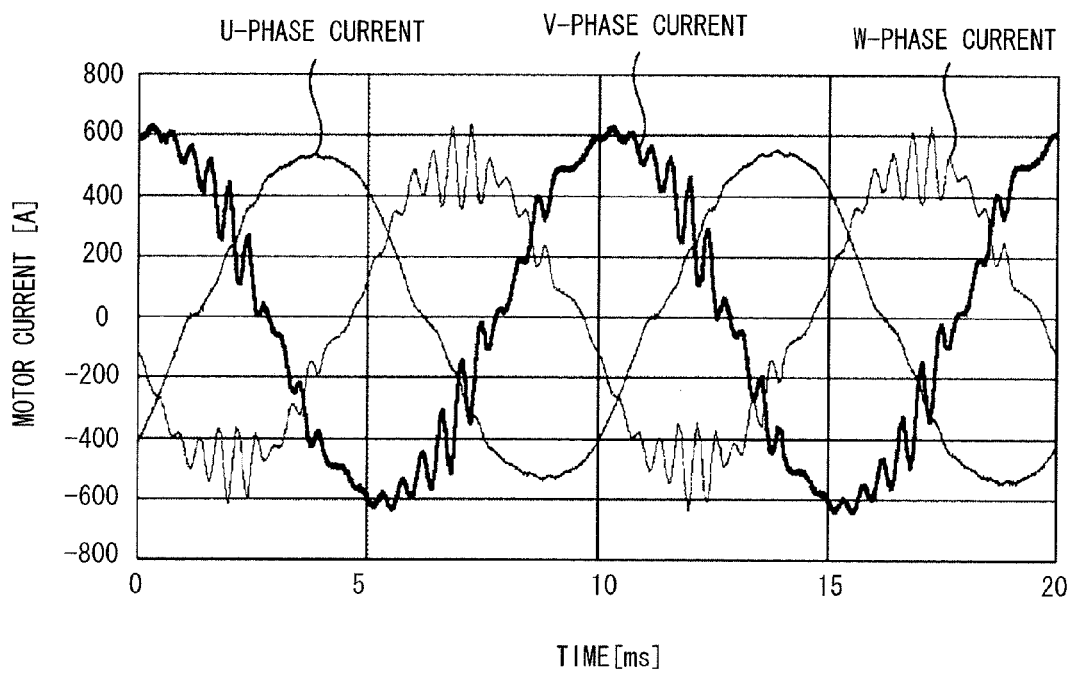
FIG. 2 shows an example of current waveforms when a phase-to-phase insulation failure in a motor has occurred.

FIG. 2 shows motor current waveforms during an experiment in which a phase-to-phase insulation failure was set up between the V-phase and the W-phase of an AC motor 1. In the following, the results of this experiment of setting up a phase-to-phase insulation failure between the V-phase and the W-phase will be explained as an example. In this experiment, the AC motor 1 was driven at a fundamental frequency of 100 Hz and with a current command value of 500 A. The motor current of 500 A in this experiment is a high current that exceeds the specification for the AC motor 1, and the continuous passage of this high current generates heat in the motor winding. Properly, sine wave currents like the U-phase current waveform of FIG. 2 should also flow in the V-phase and the W-phase. However in this experiment, due to the heat generated in the motor windings by driving the motor at high current, the insulating material provided to the motor windings gradually deteriorated or carbonized, and accordingly the resistance of the insulation between the motor windings dropped and a phase-to-phase insulation-failed state arose. As shown in FIG. 2, since a certain amount of resistance still remained between the phases in this phase-to-phase insulation-failed state, accordingly a phase difference of 120° was still maintained between the phases of the fundamental wave of the motor current, and there was no appearance of the phenomenon of the phase difference between the short circuited phases of the motor current fundamental wave changing to approximately 180°, as appears during perfect short circuiting between the phases. However, since the resistances and the inductances of the motor windings changed due to the decrease of the resistance between phases, accordingly impedance changes appeared in the motor control circuit system as high frequency components superimposed upon the motor current fundamental waves, as shown for the V-phase and the W-phase in FIG. 2.

Figure 3:
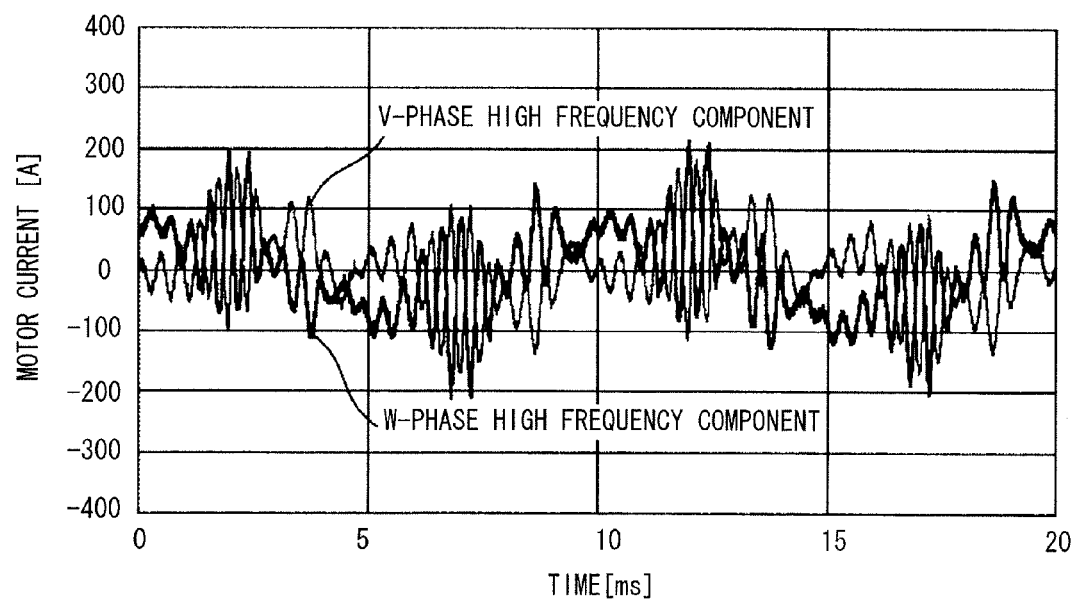
FIG. 3 shows the waveforms of high frequency components during a phase-to-phase insulation failure, extracted from the V- and W-phases waveforms in FIG. 2, subtracting the fundamental waveform components from them.

FIG. 3 shows, as superimposed, the waveforms when the high frequency components in the motor current fundamental waves during this phase-to-phase insulation failure are supposed to have been extracted by HPFs. The characteristic is evident in these extracted high frequency components that a phase difference of approximately 180° for the short circuit between phases is present, due to impedance changes of the system. Accordingly, by detecting a phase difference of more than approximately 120° and less than approximately 240° between the high frequency components extracted for two phases, it is possible to determine that a state has arisen in which short circuiting in the motor control circuit between those phases has taken place, in other words that phase-to-phase insulation failure has occurred. It should be understood that if the phase difference between the high frequency components that have been extracted for two phases is within the range from 170° to 190°, then this is a region in which it is almost certain that a phase-to-phase insulation failure has occurred, while, if the phase difference between the high frequency components that have been extracted for two phases is within the range from 150° to 170° or is within the range from 190° to 210°, then this is a region in which the possibility is quite high that a phase-to-phase insulation failure has occurred. On the other hand, if there is no abnormality in the motor control circuit, then, since the three phases of inverter output current are flowing as sine waves at the fundamental frequency, accordingly the high frequency components extracted by the HPFs only consist of components such as switching ripple and so on, and the amplitudes of these extracted currents are small. Accordingly, a threshold value of, for example, 20 A or greater may be set for the detection unit for high frequency components superimposed upon the inverter output current fundamental waves, and it is possible to determine upon the presence or absence of abnormality in the motor control circuit by detecting the presence or absence of high frequency components greater than this threshold value.

Next, a method will be explained of determining the phase differences between the high frequency components extracted from the inverter output current fundamental waves, in order to determine the presence of phase-to-phase insulation failure that is a symptom of motor short circuiting between phases.

Figure 4A:
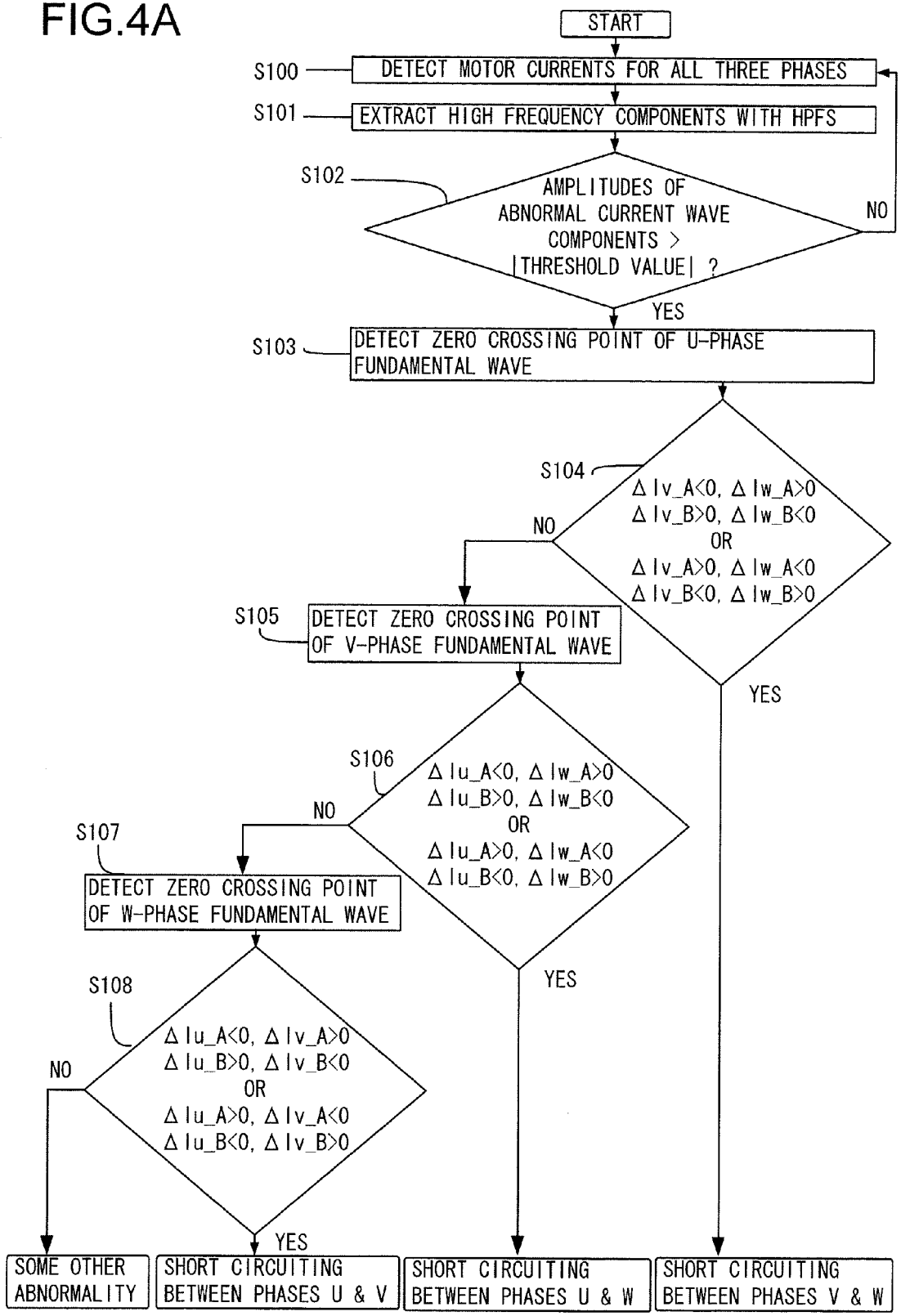

FIG. 4A is a flow chart for the abnormality detection method performed by the motor control circuit according to this first embodiment.

In a first step S100, the inverter output currents for the three phases that are flowing to the AC motor 1 via the cable are detected by the current sensors 3a through 3c. And next, in a step S101, the high frequency components superimposed upon the current fundamental waves are extracted by passing each of these currents that has been detected through an HPF that is constituted with a resistance and an electrostatic capacitance, or with an op amp or the like. If, in a step S102, the amplitude of any one of the extracted high frequency components is greater than a threshold value that is set as desired, then it is decided that there is an abnormality with the motor control circuit, and a phase difference determination for the extracted high frequency components is performed. It should be understood that it would also be acceptable, at the time point that the high frequency component having an amplitude greater than the set threshold value is detected, to take the opportunity of transmitting a failure signal to the exterior to the effect that an abnormality in the motor control circuit has occurred. Moreover, as will be described hereinafter, it would also be acceptable to arrange to change this threshold value according to the rate of change of a torque command value, or according to the rotational speed of the motor.

The phase differences between the high frequency components that have been extracted may be simply determined, or by taking the sum of each pair of phases. Since, during short circuiting between two phases, the currents of two phases that are shorted together have current waveforms whose phases are approximately 180° apart, i.e. that are opposite, in principle their sum becomes equal to zero. However, since the sum may not necessarily become zero if an offset from the zero point is present in one or both of the high frequency components extracted by this method, accordingly it would also be acceptable to employ the following method.

Figure 5:
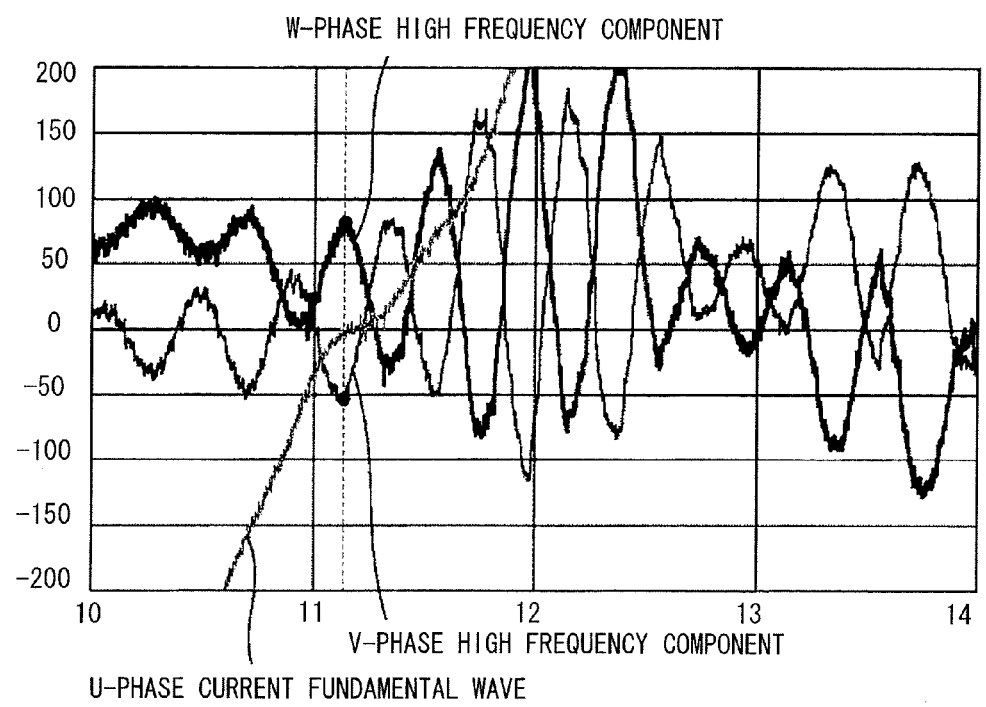
FIG. 5 is a figure for explaining the timing for extracting the high frequency components of V- and W-phases waveforms.
Figure 6:
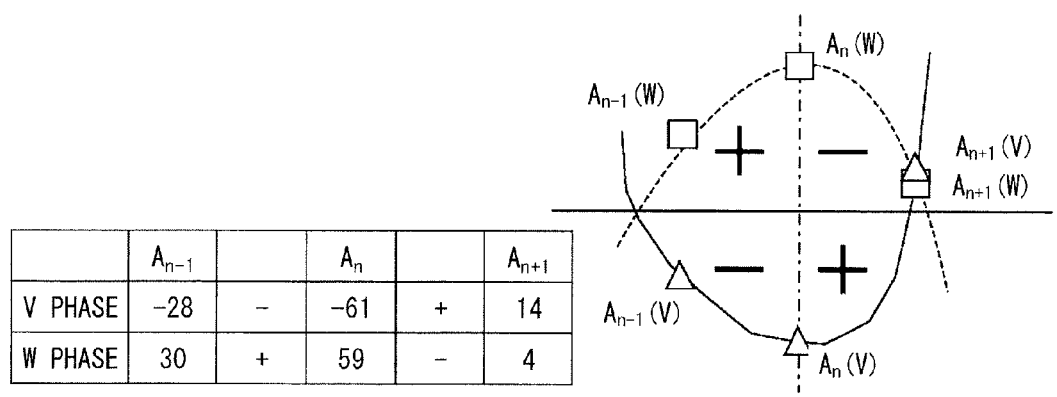
FIG. 6 is a conceptual figure showing a phase difference determination method using the high frequency components of V- and W phases waveforms in FIG. 5.

For making a determination of the phase differences between the high frequency components that have been extracted, at a zero crossing time point of the fundamental current waveform of one phase, the current values sampled at three points in total, i.e. at the above mentioned zero crossing point and at two points in the vicinity thereof, in each high frequency component of two other phases, and then the amounts of change and the signs of change are arithmetically processed to determine the phase difference. FIG. 5 shows the high frequency component detection timing for the V-phase and the W-phase at a zero crossing time point of the U-phase current fundamental wave. And FIG. 6 is a conceptual figure for determining the detection timings for the high frequency components and the amounts and signs of their change.

The current values of the high frequency components for the V-phase and the W-phase at the zero crossing time point of the U-phase current fundamental wave are respectively detected as $A_n(V)$ and $A_n(W)$, and the current values for the previous and the subsequent sampling cycles are respectively detected as $A_{n-1}(V)$, $A_{n-1}(W)$ and $A_{n+1}(V)$, $A_{n+1}(W)$. Using the total of three values that have been detected, i.e. the value $A_n$ in this cycle, the value $A_{n-1}$ in the previous cycle, and the value $A_{n+1}$ in the next cycle, each of the differentials $\Delta Iv\_A = A_n(V) - A_{n-1}(V)$, $\Delta Iv\_B = A_{n+1}(V) - A_n(V)$, and $\Delta Iw\_A = A_n(W) - A_{n-1}(W)$, $\Delta Iw\_B = A_{n+1}(W) - A_n(W)$ is calculated. If, according to these differentials that have been calculated, the amounts of change and the signs of change of the high frequency components for two of the phases are mutually opposite, as with $\Delta Iv\_A<0$, $\Delta Iv\_B>0$, $\Delta Iw\_A>0$, and $\Delta Iw\_B<0$, or $\Delta Iv\_A>0$, $\Delta Iv\_B<0$, $\Delta Iw\_A<0$, and $\Delta Iw\_B>0$, then it is possible to determine that the phase difference between these two phases is approximately 180°. By detecting the phase difference between the high frequency components for two of the phases as being approximately 180° in this manner, it is possible to determine that a phase-to-phase insulation failure has occurred between those two phases.

In the step S103 of FIG. 4A and in the following steps, the phase in which an abnormality is present is specified by using the determination method described above. First in the step S103 the zero crossing point of the U-phase fundamental wave is detected. Next in a step S104 the high frequency components for the V-phase and for the W-phase at this zero crossing point of the U-phase that has been detected and at the previous and subsequent points thereto are extracted. And the high frequency components for the V-phase and for the W-phase that have thus been extracted are compared together using the method described above, and, if $\Delta Iv\_A<0$, $\Delta Iv\_B>0$, $\Delta Iw\_A>0$, and $\Delta Iw\_B<0$, or $\Delta Iv\_A>0$, $\Delta Iv\_B<0$, $\Delta Iw\_A<0$, and $\Delta Iw\_B>0$, then it is determined that a short circuit between the V-phase and the W-phase is present. But if it is not the case that $\Delta Iv\_A<0$, $\Delta Iv\_B>0$, $\Delta Iw\_A>0$, and $\Delta Iw\_B<0$, or $\Delta Iv\_A>0$, $\Delta Iv\_B<0$, $\Delta Iw\_A<0$, and $\Delta Iw\_B>0$, then the flow of control is transferred to a step S105.

In this step S105, the zero crossing point of the V-phase fundamental wave is detected, a similar comparison calculation to that of the step S104 is performed for the U-phase and the W-phase, and a decision is made as to whether or not a short circuit between the U-phase and the W-phase is present. And in the steps S107 and S108, similar processing is performed to that of the steps S103 and S104, and, if it is decided that no short circuit between the U-phase and the V-phase is present, then it is determined that some other abnormality is present.

It should be understood that although, in this embodiment, the processing starts by detecting the zero crossing point of the U-phase fundamental wave, it would also be acceptable to start by detecting the zero crossing point of the V-phase fundamental wave, or by detecting the zero crossing point of the W-phase fundamental wave.

FIG. 4B is an abnormality detection flow chart for this motor control device according to the first embodiment of the present invention, when the high frequency components for all three phases are sampled in each sampling cycle, rather than only at the fundamental current wave zero crossing time point for one cycle. This flow chart is the same as the flow chart shown in FIG. 4A, from the detection of the motor currents for the three phases flowing to the AC motor 1, up to the extraction from these detected currents by HPFs of the high frequency components superimposed upon the motor current fundamental waves. In this method, only the sampling timing when determining the phase differences from the high frequency components that have been extracted is different: the high frequency components for all the three phases are sampled in each sampling cycle, and their amounts of change and the phase differences are calculated from the values at the past three sampling points. Continually, the high frequency components are sampled in the steps S110 through S112, calculations are performed in the steps S113 through S115, and, if a decision is reached that no short circuit is present between any of the phases, then the flow of control returns to the steps S110 through S112 and similar processing is repeated. While quite a lot of calculation processing capability is required due to the processing of the steps S110 through S115 being performed repeatedly, on the other hand the reliability is enhanced, since it is possible to determine that a phase-to-phase insulation failure has occurred at an early stage, i.e. at the instant that a phase difference of approximately 180° has appeared between the high frequency components for any two of the phases.

Moreover if, while performing the sampling constantly and repeatedly, it is merely decided in the steps S113 through S15 that the amount of change of the values at the past three points has changed from positive to negative, or that it has changed from negative to positive, then the calculation burden of the method described above may be reduced, so that the burden upon the CPU and so on may be reduced. Furthermore, the calculation can be performed at higher speed, since the calculation burden is reduced.

The Second Embodiment

Figure 7:
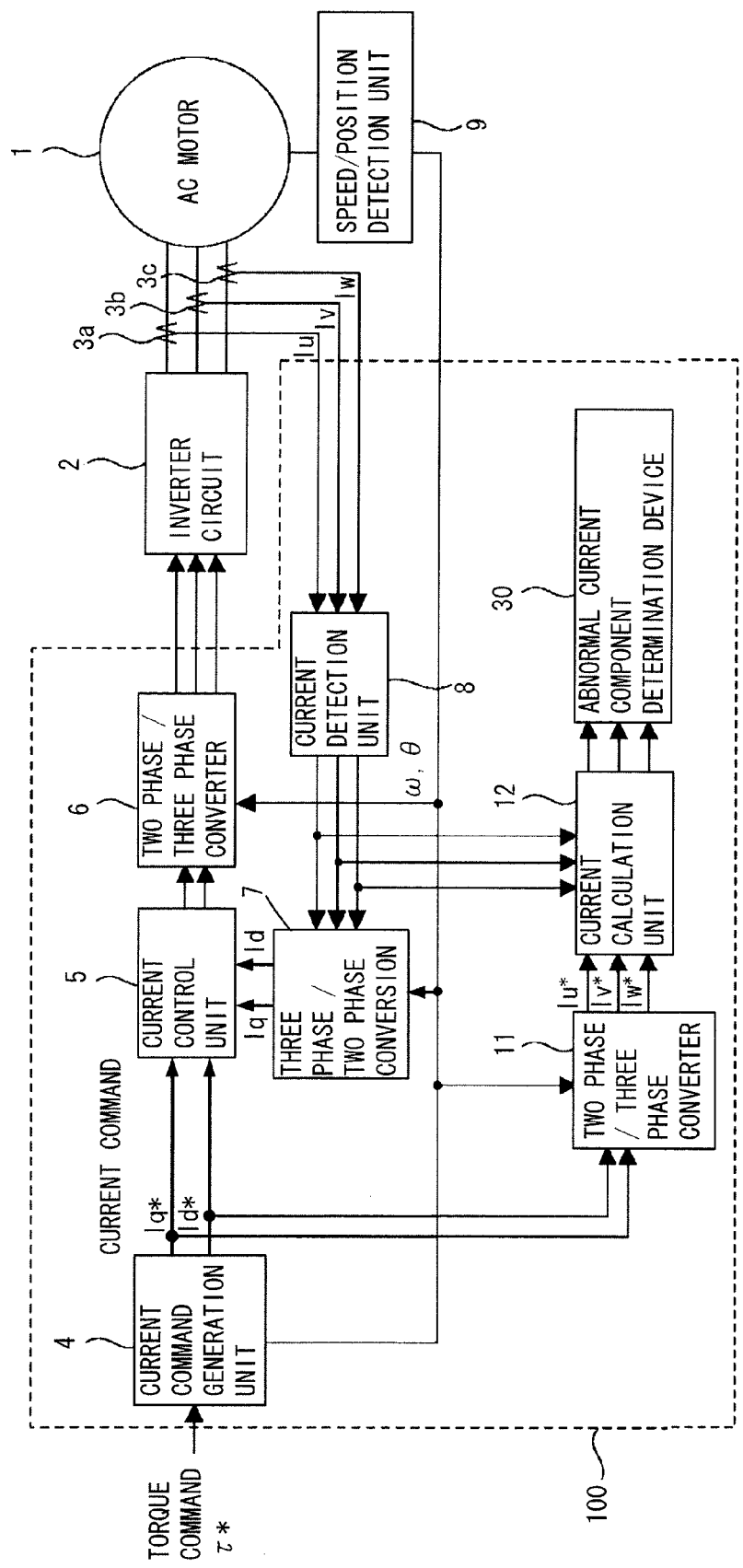
FIG. 7 is a schematic block diagram of a motor control circuit of a second embodiment a electric power conversion system/electric power conversion device according to the present invention.

FIG. 7 is a control block diagram of a motor control device according to a second embodiment of the present invention. The structure of the fundamental control units for the AC motor 1 is the same as in the case of the first embodiment shown in FIG. 1.

With the abnormality detection method of this second embodiment, detection of abnormal current components and decision as to the presence of abnormality in the motor control circuit is performed by calculation processing being executed by a current calculation unit 12, using a three phase current command value that has been converted by a two phase/three phase converter 11 from a initial current command value generated by a current command generation unit 4, and the motor current values from the current sensors 3a through 3c as detected by a current detection unit 8.

It should be understood that in this case, in order reliably to detect high frequency components due to abnormality in the motor control circuit, it is desirable for the motor current values from the current sensors 3a through 3c detected by the current detection unit 8 to be sampled at a higher frequency than the fundamental frequency of the motor current, and, if possible, it is desirable to perform this sampling at a frequency greater than or equal to the carrier frequency at which the inverter circuit 2 is switched.

Figure 8:
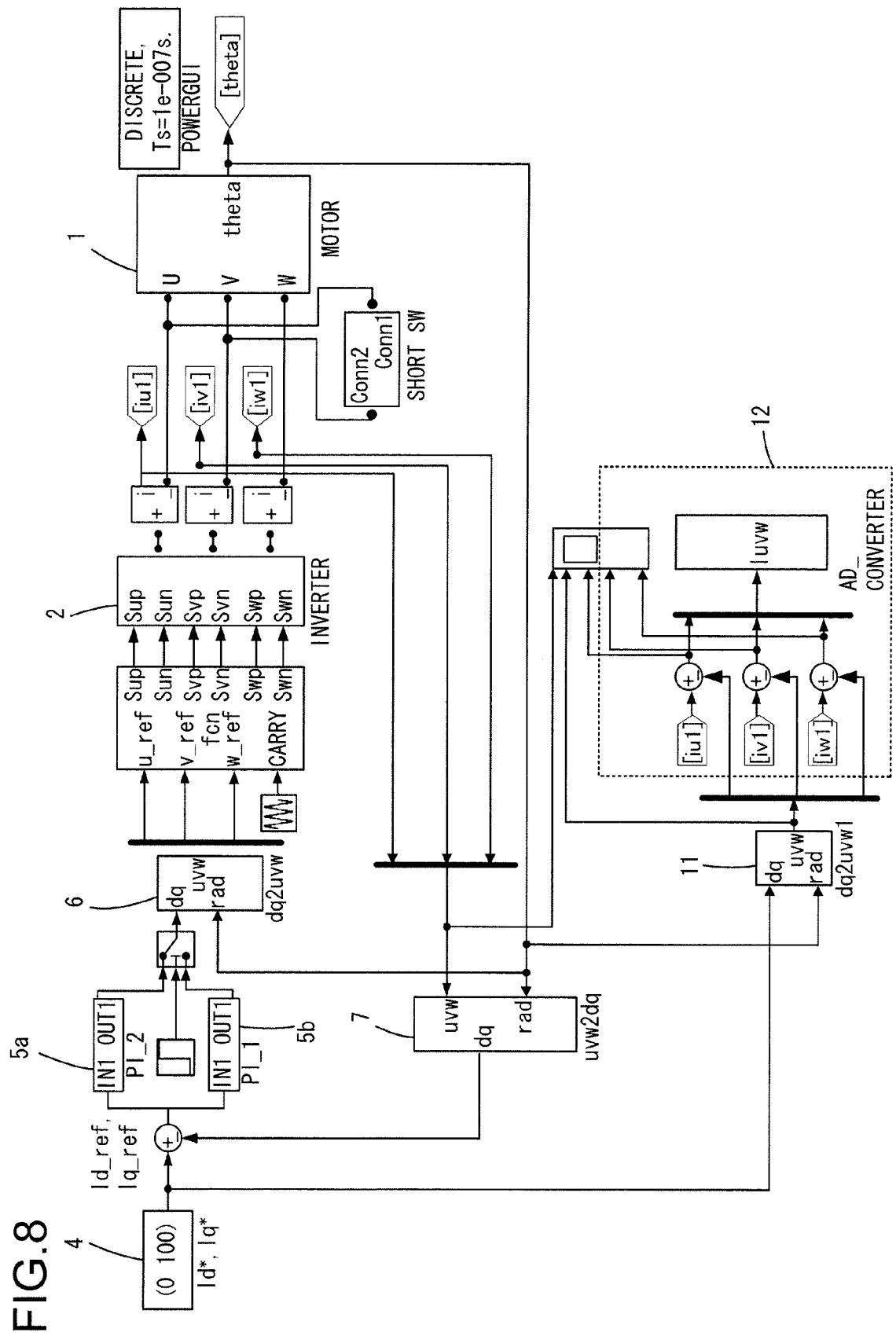
FIG. 8 is a model figure for abnormality detection simulation, applied to the motor control circuit shown in FIG. 7.

FIG. 8 is a model figure for abnormality detection simulation, according to the second embodiment of the present invention. In this simulation, the behavior is simulated when a phase-to-phase insulation failure between the U-phase and the V-phase occurs while the AC motor 1 is being driven at a fundamental frequency of 100 Hz and at a current command value of 100 A.

Figure 9D:
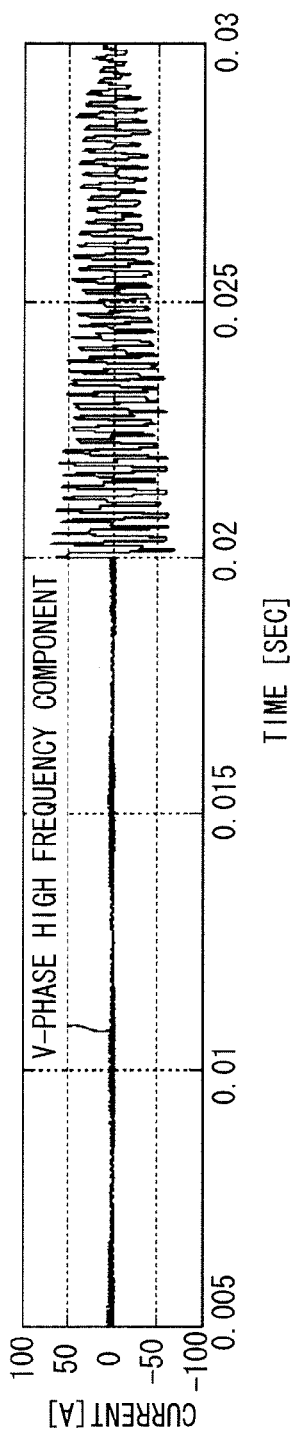
Figure 9E:
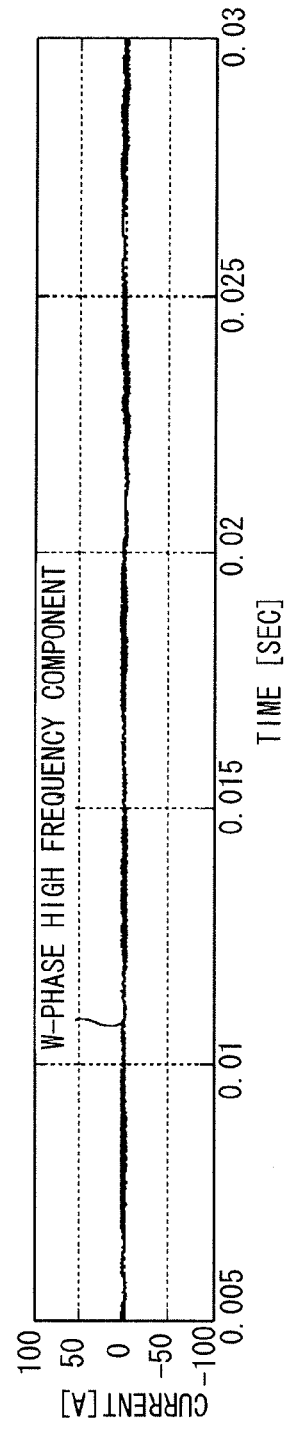

And FIGS. 9A, 9B, 9C, 9D, and 9E show simulation results during this phase-to-phase insulation failure between the U-phase and the V-phase. Among these waveforms, respectively, FIG. 9A shows the three phase inverter output current, FIG. 9B shows the three phase motor current command value, FIG. 9C shows the high frequency component of the U-phase current, FIG. 9D shows the high frequency component of the V-phase current, and FIG. 9E shows the high frequency component of the W-phase current.

At first the three phase inverter output current is a sine wave having amplitude of 100 A and fundamental frequency of 100 Hz, and then, when the simulated phase-to-phase insulation failure between the U-phase and the V-phase occurs at the simulation timing point, 0.02 s after the simulation start, a high frequency component starts to be superimposed upon each of these motor currents. On the other hand, the three phase motor current command is a initial motor current command that is calculated from a two phase current command externally to the current control loop, accordingly it experiences no influence even when some abnormality such as a phase-to-phase insulation failure or the like has occurred with the motor control circuit.

Accordingly, it is possible to extract the high frequency components superimposed upon each of the phase currents other than the fundamental current components by taking the differentials between the three phase inverter outputs and the three phase motor current command values. In this simulation, the high frequency components that are superimposed upon the inverter output current fundamental waves for the U-phase and the V-phase during this phase-to-phase insulation failure are extracted, as shown in FIGS. 9C and 9D.

As described in connection with the first embodiment as well, the high frequency components that are extracted exhibit the characteristic that a phase difference of approximately 180° is present between the phases that are short circuited together, due to impedance changes of the system. Accordingly, by detecting a phase difference between the high frequency components for two of the phases that have been extracted of greater than approximately 120° and less than approximately 240°, it is possible to determine the presence of a state in which short circuiting between phases in the motor control circuit is occurring, in other words that a phase-to-phase insulation failure is occurring. It should be understood that, in the same way as with the first embodiment, if the phase difference between the high frequency components that have been extracted for two phases is within the range from 170° to 190°, then this is a region in which it is almost certain that a phase-to-phase insulation failure has occurred, while, if the phase difference between the high frequency components that have been extracted for two phases is within the range from 150° to 170° or is within the range from 190° to 210°, then this is a region in which the possibility is quite high that a phase-to-phase insulation failure has occurred.

On the other hand, if there is no abnormality in the motor control circuit, then, since the three phases of inverter output current flow as sine waves at the fundamental frequency, accordingly the extracted high frequency components only consist of components such as switching ripple and so on, and the amplitudes of these extracted currents are small. Accordingly, a threshold value of, for example, 20 A or greater may be set to the detection unit for high frequency components superimposed upon the inverter output current fundamental waves, and it is possible to determine upon the presence or absence of abnormality in the motor control circuit by detecting the presence or absence of high frequency components greater than this threshold value.

Now the method will be explained for determining the phase difference between the high frequency components that have been extracted from the inverter output current fundamental waves according to this second embodiment having the structure described above.

FIG. 11 is a flow chart showing the motor control circuit abnormality detection method according to this second embodiment.

In the step S203, an initial two phase current command that has been generated from a higher ranking controller is converted into a three phase current command. It should be understood that here an initial two phase current command is not such a current command value that has been converted by the two phase/three phase conversion unit 11 shown in FIG. 7, but rather a current command value that is generated by the current command generation unit 4 according to the motor speed and magnetic pole position as detected by the speed/position detection unit 9 from an encoder or resolver or the like that is provided to the AC motor 1 and the torque command value τ* from the higher ranking controller, and is not the command value itself that, if an abnormality has occurred in the motor control circuit, changes incorporating the current feedback value at this time.

Next, in a step S201, the differentials between the three phase inverter output currents as detected by the current sensors 3a through 3c and the three phase command currents are taken. And, in a step S102, if the amplitude of any one of the current differentials, in other words the amplitude of any one of the abnormal current components, is greater than a threshold value, then it is decided that a short circuit has occurred between some pair of phases. By taking the differentials between the three phase command currents and the detected three phase currents, since these differentials are zero or greater if no current is flowing due to a command, such as there being an abnormality in the motor control circuit or the like, accordingly, if one of them exceeds a predetermined value that can be set as desired, then it is possible to perform detection of abnormality in the motor control circuit from this differential. In addition, by taking the differentials between the three phase command currents and the detected three phase currents, it is possible to detect abnormality even during occurrence of an abnormality in which the high frequency components as in the case of perfect short circuiting between phases are not superimposed upon the inverter output current fundamental wave. In principle it is possible to determine upon the presence or absence of abnormality in a simple manner at the time point that a high frequency component of large amplitude is detected in the step S102, since if there is no abnormality in the motor control circuit then there is a only a certain small amount of high frequency component of small amplitude such as switching ripple and so on present in the motor current fundamental wave circuit. If it is decided in the step S102 that an abnormal current is being generated, then the flow of control proceeds to the sequence of steps from S205 to S210.

Figure 12:
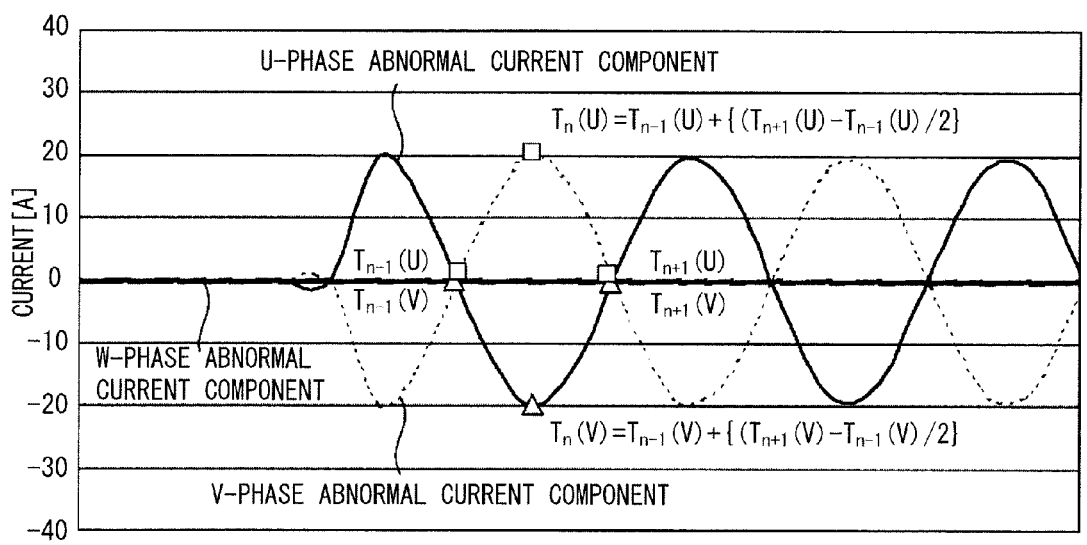
FIG. 12 is a figure for explaining the phase difference determination method with the high frequency components shown in FIGS. 9A through 9E, according to the second embodiment of the present invention.

The phase determination method in the steps from S205 to S210 will now be explained using FIG. 12. In this embodiment, the phase determination for an abnormal current component for each of the extracted phases is performed according to the time points of detection of the two zero crossing points of that high frequency component sampled each time, and the time point of the peak current point between those two zero crossing points. FIG. 12 is a conceptual figure showing the method of determining the phase difference from the two zero crossing points of the extracted current components during a phase-to-phase insulation failure. In the steps S205 through S207 of FIG. 11, the time instants $T_{n-1}(U)$ and $T_{n+1}(U)$ of the two zero crossing points of the high frequency component of the U-phase, and the time instant $T_n(U)=T_{n-1}(U)+\{(T_{n+1}(U)-T_{n-1}(U))/2\}$ of the peak point between these two zero crossing points are obtained, and, in a similar manner, the values for the V-phase and the W-phase, i.e. $T_{n-1}(V)$, $T_{n+1}(V)$ and $T_{n-1}(W)$, $T_{n+1}(W)$, are detected, and $T_n(V)$ and $T_n(W)$ are obtained. And in the steps S208 through S210, by comparing together the time instants of these peak points, it is determined which phases are the ones between which a short circuit is occurring. In the step S208, if the time instants of the peak points for two of the phases are equal, i.e. if $T_n(U)=T_n(V)$, then it is determined that a phase difference of 180° is present between the extracted high frequency components for the U- and V-phases, and so it may be decided that a short circuit is occurring between the U- and V-phases. And in the steps S209 and S210 as well, similar decisions are respectively performed for the V- and W-phases, and for the W- and U-phases. Moreover, even if the values in question do not perfectly agree with one another like $T_n(U)=T_n(V)$, it would also be acceptable to determine that a phase difference of 180° is present for the U- and V-phases if $T_n(V)$ falls within a range $\pm\Delta$ of $T_n(U)$. Here, the range of $\pm\Delta$ is determined as being a range in which, if the time instant of the peak point for another phase falls within that range, no problem arises even if it is determined that there is a phase difference of 180°.

If the method described above is used, then it becomes possible to detect short circuiting between the phases more reliably. If on the other hand rapidity is required, then it is possible simply to specify the phase in which abnormality is occurring according to the presence or absence of high frequency components for the various phases. Moreover, it would also be acceptable to determine the presence or absence of a phase difference in a simple manner, by detecting the zero crossing point time instants $T_{n-1}(U)$, $T_{n-1}(V)$, and $T_{n-1}(W)$ of the current components that have been simply extracted, and by making a decision as to whether or not the zero crossing point time instants of the extracted current components are the same. The abnormality state or fault mode in the motor control circuit may be estimated according to the current values or the phase differences in the high frequency components for the various phases that have been extracted, by this type of comparison of the differentials between the command currents and the detected currents. It should be understood that, in connection with the phase difference detection method for the extracted current components, it would also be acceptable to use the phase difference decision method of the first embodiment according to the amounts of change and the signs of the extracted current components, as shown in FIGS. 4A and 4B. In a similar manner, in the first embodiment, it would also be acceptable to use the phase difference decision method as shown in FIG. 11, where the time instant of a peak current point between two zero crossing points is compared between two phases.

FIGS. 13A through 13D show the current waveforms during abnormalities of the motor control circuit.

FIG. 13A is the motor current waveform when it is supposed that short circuiting between phases has occurred. When a state of perfect short circuiting between phases has been established, the value of the motor current increases abruptly because, as seen from the inverter, the inductance and the resistance of the motor winding are extremely low, and moreover the phase difference between the current waveforms of the two phases that are short circuited together changes from the normal 120° to approximately 180°. When, according to the present invention, the differential between the current command values and the detected current values is taken, it is possible to detect current components as shown in FIG. 13B.

Moreover, FIG. 13C is a motor current waveform when it is supposed that short circuiting of one phase to the casing has occurred. If it is supposed that the U-phase motor cable and the casing of the AC motor 1 or the casing of the inverter control device have become short circuited together, then a high frequency component is superimposed upon the short circuited phase only, since leakage current flows via the motor cable to the circuit between the motor cable and the casing created by the short circuited phase. And FIG. 13D shows the waveform obtained by taking the differential between the current command value and the detected current value. By taking this differential, it is possible to extract the high frequency components for the phase that is short circuited to the casing.

During an abnormality of the motor control circuit such as the perfect short circuiting between phases shown in FIG. 13B or short circuiting to the casing shown in FIG. 13D, besides the motor current fundamental waves changing, abnormal current components such as the high frequency components described as above are superimposed upon the abnormal phases. Accordingly, as shown in FIGS. 13A and 13C, by taking the differentials between the current values detected by the current sensors 3a through 3c and the current command values generated by the current command generation unit 4, it is possible to determine upon the presence or absence of abnormality in the motor control circuit in a simple manner according to the presence or absence of these differentials. Furthermore, by extracting each abnormal current component, and by comparing together the phase differences of the extracted currents, if there is a phase difference of approximately 180°, it is possible to determine that a phase-to-phase insulation failure is occurring in the motor control circuit.

Since as has been described above, in this second embodiment, it is possible to extract the abnormal current components by taking the differentials between the current command values and the detected current values, even without extracting the high frequency components that are superimposed upon the abnormal motor current fundamental waves with a filter circuit, accordingly it is possible to detect abnormality in the motor control circuit according to whether or not any abnormal current component is detected. It should be understood that since, when regenerative braking is being performed, the phases of the currents are simply inverted as compared to the case of the electric motor being driven, accordingly it is still possible to employ either in the first embodiment or in the second embodiment.

The Third Embodiment

In a third embodiment, the threshold value in the step S102 of FIG. 11 shown for the second embodiment is varied. The other features of this embodiment are the same as for the second embodiment.

Figure 14:
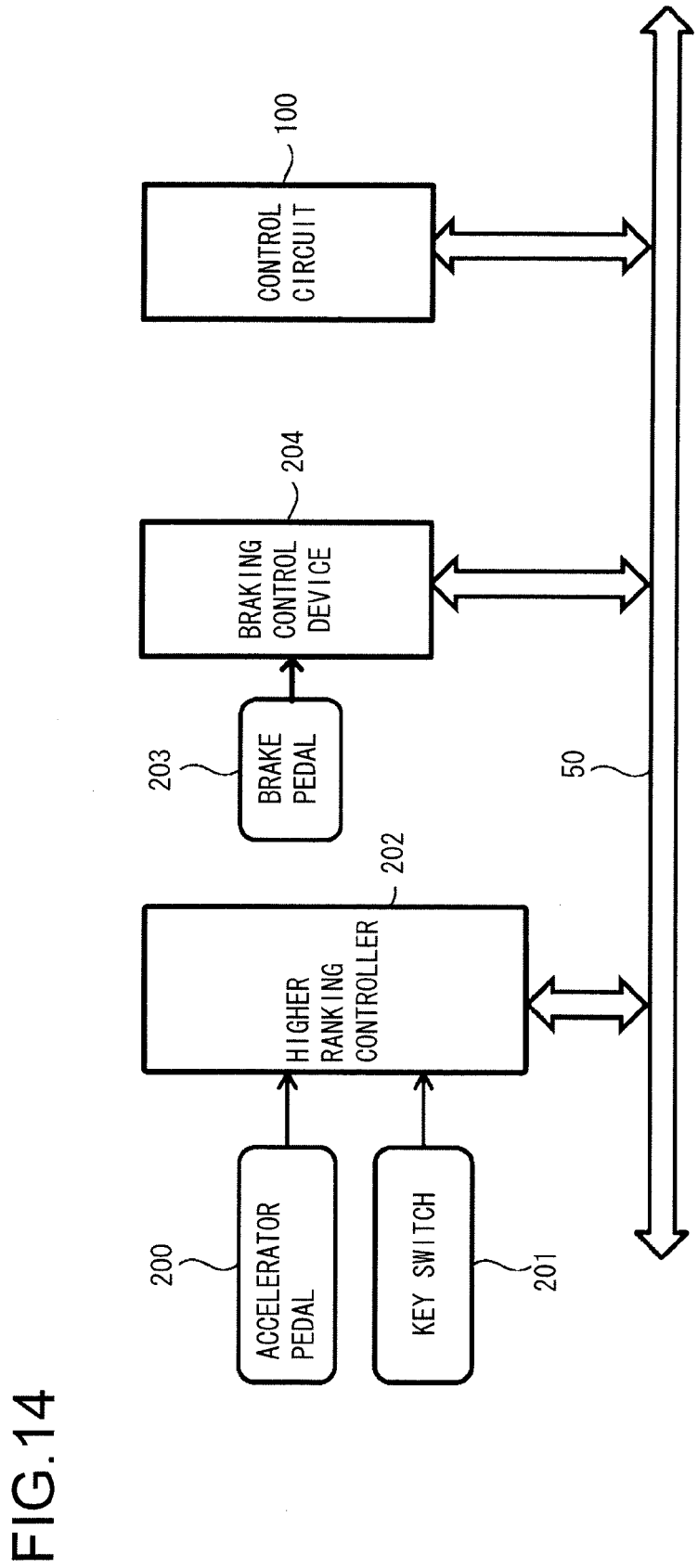
FIG. 14 is a block diagram of a control system of a vehicle in the 3rd embodiment employing the electric power conversion system including a electric power conversion system/electric power conversion device according to the present invention.
Figure 15B:
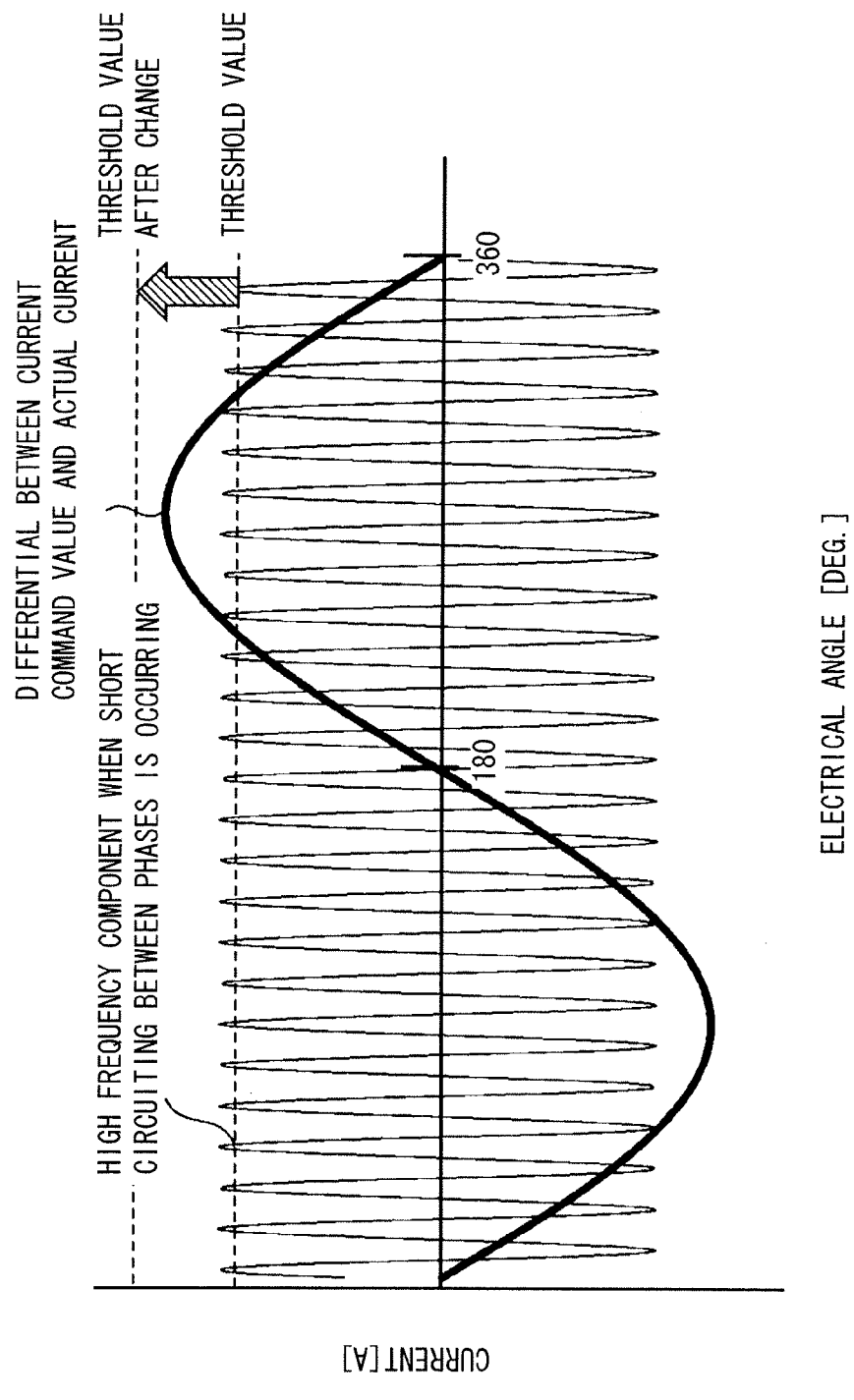
FIG. 15B shows a method for setting a threshold value when the rate of change of the torque current command value is large, in the third embodiment employing the electric power conversion system/electric power conversion device according to the present invention.

The case when a first torque command value increases abruptly will be explained with reference to FIG. 14. FIG. 14 is a figure showing a control system in which this electrical power conversion system or electrical power conversion device is applied to a vehicle. With a vehicle, when for example an accelerator pedal 200 is abruptly depressed, the rate of change of a torque command value τ* that corresponds to the amount of depression of the accelerator pedal becomes rather great. A higher ranking controller outputs the above described torque command value to the control circuit 100 via a signal transmission path 50. Since a current command value is calculated and outputted by the control circuit 100 based upon this torque command value, if the rate of change of the torque command value is large, then the rate of change of the current command value also becomes large, and thus the difference between the current command value and the actual current value becomes large. Due to this, as shown in FIG. 15A, the difference between the current command value and the actual current value becomes large, even if short circuiting between phases is not occurring. FIG. 15B is a figure showing the differential between the current command value shown in FIG. 15A and the actual current value when no short circuiting between phases is taking place. When the threshold value for abnormal current decision is set as shown in FIG. 15B, if there is a large differential between the current command value and the actual current value, then there is a possibility that, for example, it may be decided that short circuiting between phases is taking place, even though actually short circuiting between phases is not taking place and it is merely in the state of a insulation failure. Thus, if the speed of depression of the accelerator pedal 20 is great, in other words if the rate of change of the torque command value is greater than a predetermined value, then it is possible to enhance the reliability of the control by changing the threshold value for abnormal current decision, because the possibility of erroneous detection of short circuiting between phases becomes smaller than during normal conditions.

In the same manner, during regenerative braking when the brake pedal 203 has been abruptly depressed, a braking control device 204 outputs a torque command value the magnitude of whose rate of change corresponds to the amount of depression of the brake pedal 203. The reliability during control is enhanced by varying the threshold value on the basis of the rate of change of this torque command value, since the possibility of erroneous detection of phase-to-phase short circuiting in normal conditions becomes lower. Moreover, a starting torque is also required when the vehicle is being started from rest, and, since at this time the amount of change of the torque command value is large, accordingly the reliability during control is enhanced by changing the threshold value if as described above the rate of change of the torque command value is greater than or equal to a predetermined rate of change, since the possibility of erroneous detection of phase-to-phase short circuiting in normal conditions becomes lower.

Moreover, it would also be acceptable to change the threshold value for abnormal current determination on the basis of the rate of change of the torque command value, as described above, in the first embodiment as well. The reliability during control is thereby enhanced, since the possibility of erroneous detection of phase-to-phase short circuiting in normal conditions becomes lower due to changing the threshold value for abnormal current determination on the basis of the rate of change of the torque command value.

Figure 21:
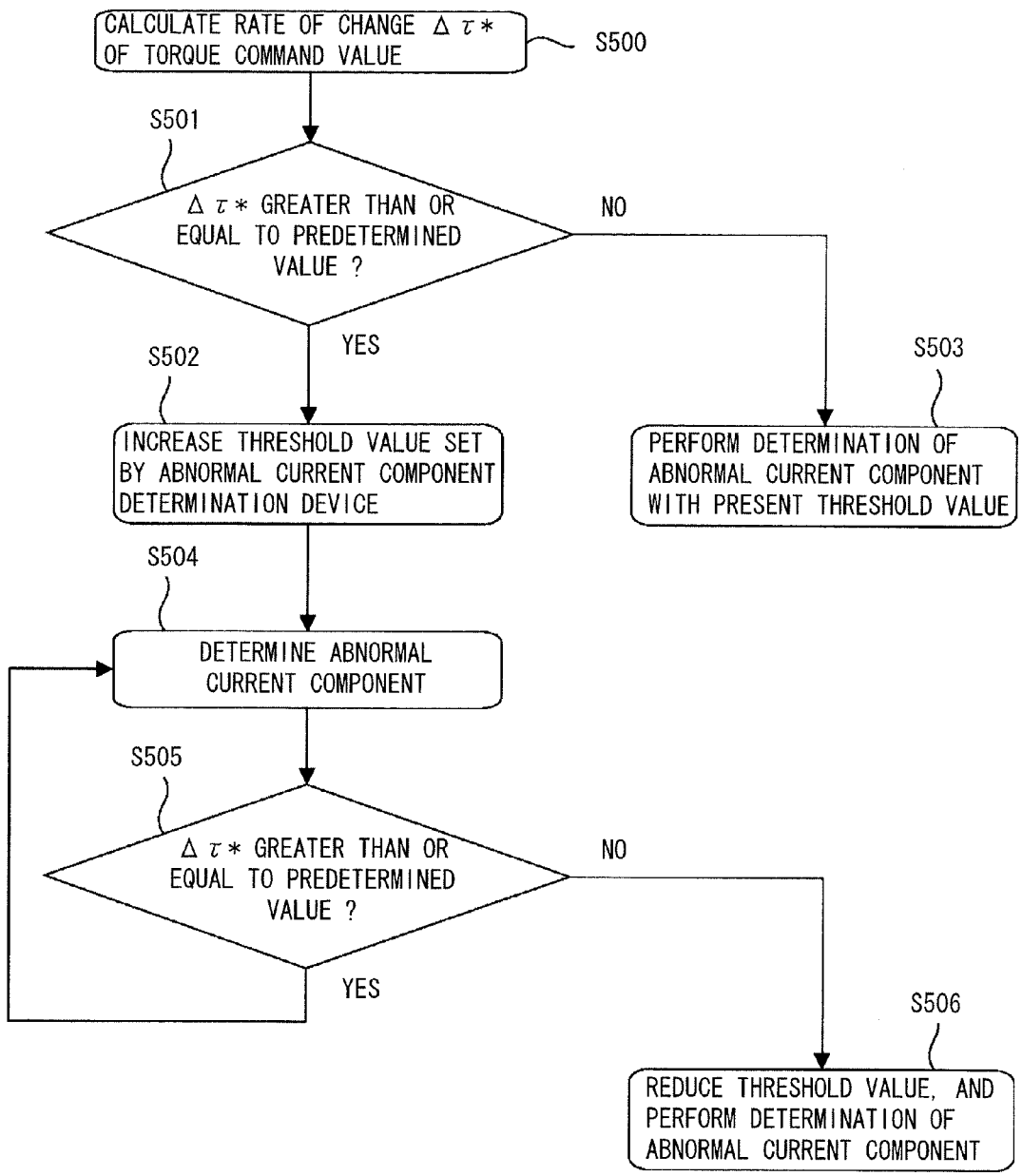
FIG. 21 is a flow chart related to decision method upon an abnormal current component when the rate of change of the torque command value is large, in the third embodiment employing the electric power conversion system/electric power conversion device according to the present invention.

A flow chart for when the threshold value that is used for determining the abnormal current component on the basis of the amount of change of the torque command value is shown in FIG. 21. In a step S50, the control circuit 100 calculates the rate of change $\Delta\tau^*$ of the torque command value. Next in a step S501 the control circuit 100 makes a decision as to whether or not this rate of change $\Delta\tau^*$ of the torque command value is greater than or equal to a predetermined value, and, if the rate of change $\Delta\tau^*$ of the torque command value is less than or equal to the predetermined value, then determination of the abnormal current component is performed with the threshold value that is currently set. On the other hand, if the rate of change $\Delta\tau^*$ of the torque command value is greater than or equal to the predetermined value, then in a step S502 the threshold value is increased and then determination of the abnormal current component is performed. It should be understood that a threshold value that is set in advance may be used for this changed threshold value; or, alternatively, it would also be acceptable to determine this changed threshold value on the basis of the rate of change $\Delta\tau^*$ of the torque command value.

The Fourth Embodiment

In the fourth embodiment, the threshold value for abnormal current decision of the first and second embodiments is changed on the basis of the motor rotational speed. as far as the other portions are concerned, they are the same as in the case of the first and the second embodiments.

Generally, it is often the case that an inverter is driven by the PWM (Pulse Width Modulation) drive method. However since, in the region in which the rotational speed of the motor is high, no very great problem of current distortion arises even if the number of times of switching is reduced to some extent, often a square wave control method is used in which the switching elements for each phase are turned ON and OFF once for each $2\pi$ of electrical angle, for the purpose of reducing switching losses and so on; or the PWM control method with less number of pulses than a normal operation, for example with lower carrier frequencies, or the like may be applied.

Figure 16:
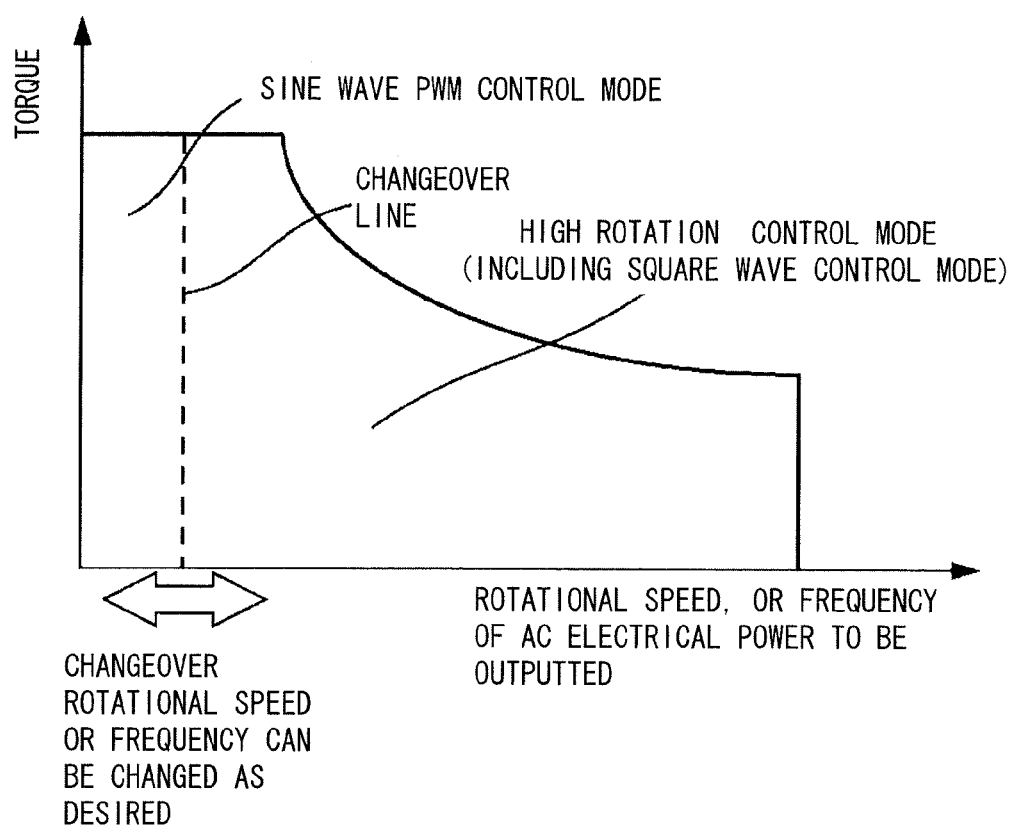
FIG. 16 is a torque speed curve for a motor, in a fourth embodiment employing the electric power conversion system/electric power conversion device according to the present invention.

FIG. 16 is a torque speed curve for a motor. When the motor rotational speed becomes higher than some predetermined rotational speed, then the control circuit 100 changes over from the normal sine-wave PWM control mode, in which the inverter 2 outputs three-phase sine-wave currents to a motor 1, to a high rotation control mode, such as the above described square wave control method or the like, and performs control so as to reduce the switching losses and so as thus to enhance the efficiency of utilization of electrical power. The changeover rotational speed may, for example, be set to 2000 rpm or the like.

When changing over the control method as described above, there is a possibility that the control may become unstable at the timing that control is changed over or at the instant of changeover or the like, and in this case sometimes it may happen that noise becomes superimposed upon the three phase inverter output current, and this is undesirable. When the threshold value for performing the abnormal current decision is (undesirably) set to a fixed value, as in the case of the first embodiment and the second embodiment, then, due to noise that is superimposed during the changeover of control, there is a possibility of erroneously detecting the presence of short circuiting between phases, even though actually the system is operating properly.

Thus, in this embodiment, the threshold value for performing abnormal current decision is raised to match the motor rotational speed at which the control method is changed over. According to this structure it becomes possible to prevent erroneous detection, and thus the reliability of the control is enhanced.

Figure 22:
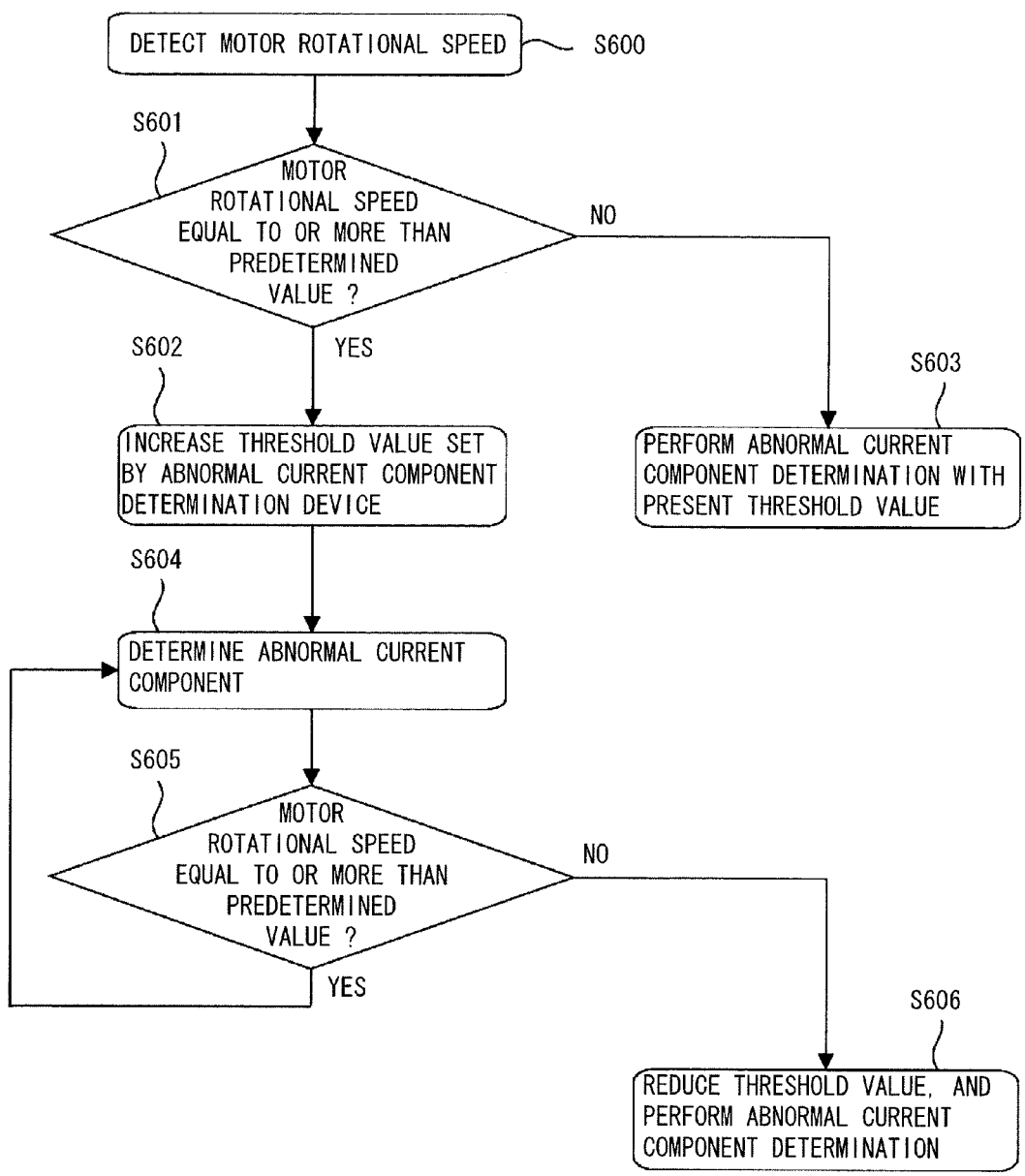
FIG. 22 is a flow chart related to decision method upon an abnormal current component corresponding to the rotational speed of the motor, in the third embodiment employing the electric power conversion system/electric power conversion device according to the present invention.

FIG. 22 is a flow chart for when the threshold value is changed on the basis of the motor rotational speed. It should be noted that here the motor rotational speed is in increasing. First in a step S600 the control circuit 100 detects the rotational speed of the motor on the basis of information from the rotation sensor. In the next step S601, the control circuit 100 makes a decision as to whether or not the rotational speed of the motor is equal to, or larger than a predetermined value. It should be understood that this predetermined value is set to the rotational speed at which changeover is to be performed from the present inverter drive method (sine-wave PWM control mode) to another inverter drive method (high rotation control mode). If the rotational speed of the motor is less than the predetermined value, then the flow of control is transferred to a step S603, in which abnormal current component determination is performed using the threshold value that is set at present. On the other hand, if the rotational speed of the motor is equal to, or larger than the predetermined value, then the flow of control proceeds to a step S602, in which the threshold value that is set by the abnormal current component determination device 30 is increased. Next, in a step S604, abnormal current component determination is performed using the threshold value that has been changed. Then in a step S605 a similar decision is performed to that made in the step S601, and, if the rotational speed is not equal to the predetermined value, then the threshold value for the abnormal current component determination device 30 is returned to the original threshold value, and then abnormality determination is performed.

It should be noted that, though the illustration is omitted, in the state that the rotational speed is in decreasing, the rotational speed at which the inverter drive method is changed over from the high rotation control mode to the sine-wave PWM control mode is set at another predetermined rotational speed higher than the above mentioned predetermined value. In other words, the changeover between the sine-wave PWM control mode and the high rotation control mode has a hysteresis characteristic corresponding to increase and decrease of the rotational speed. Accordingly, in the state that the rotational speed of the motor is in decreasing, the decision condition of the step S601 is that if the rotational speed of the motor is less than or equal to a predetermined value.

The Fifth Embodiment

The fifth embodiment is one relating to the details of the processing that is performed when the threshold value in the first through the fourth embodiments at which abnormal current determination is performed is exceeded. The other details are the same as for the first through the fourth embodiments.

Figure 17:
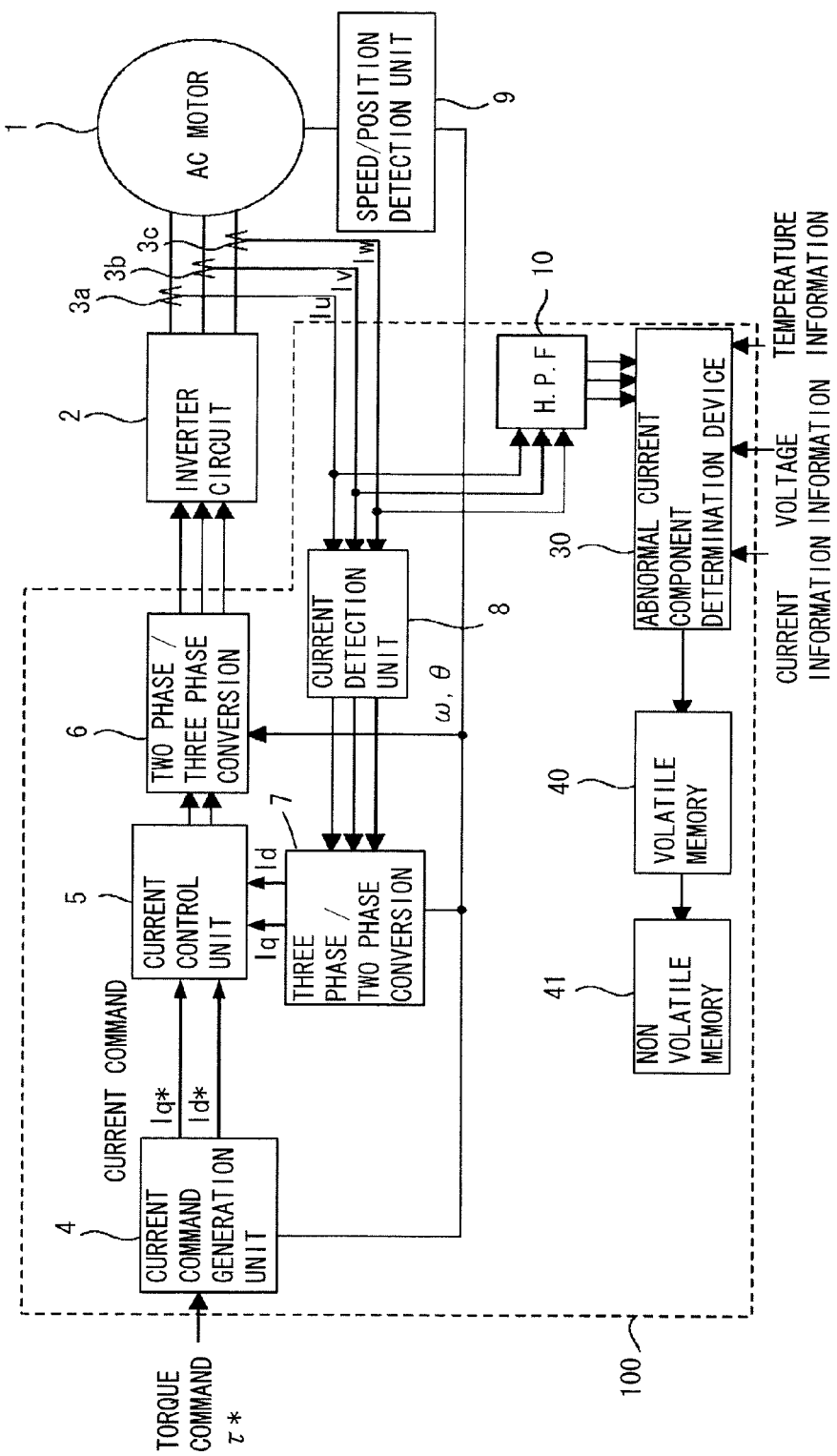
FIG. 17 is a schematic block diagram of motor control, in a fifth embodiment employing the electric power conversion system/electric power conversion device according to the present invention.

FIG. 17 is fundamentally the same as FIG. 1. The only feature of difference is that a volatile memory 40 whose stored contents disappear when supply of power is terminated and a non volatile memory 41 whose stored contents are preserved even when supply of power is terminated are provided internally to the control circuit 100. It should be understood that while here, for the sake of convenience, FIG. 1 of the first embodiment is employed, it would also be acceptable to provide the volatile memory 40 and the non volatile memory 41 within the control circuit 100 of FIG. 7, which is the structural diagram for the second embodiment.

Figure 18:
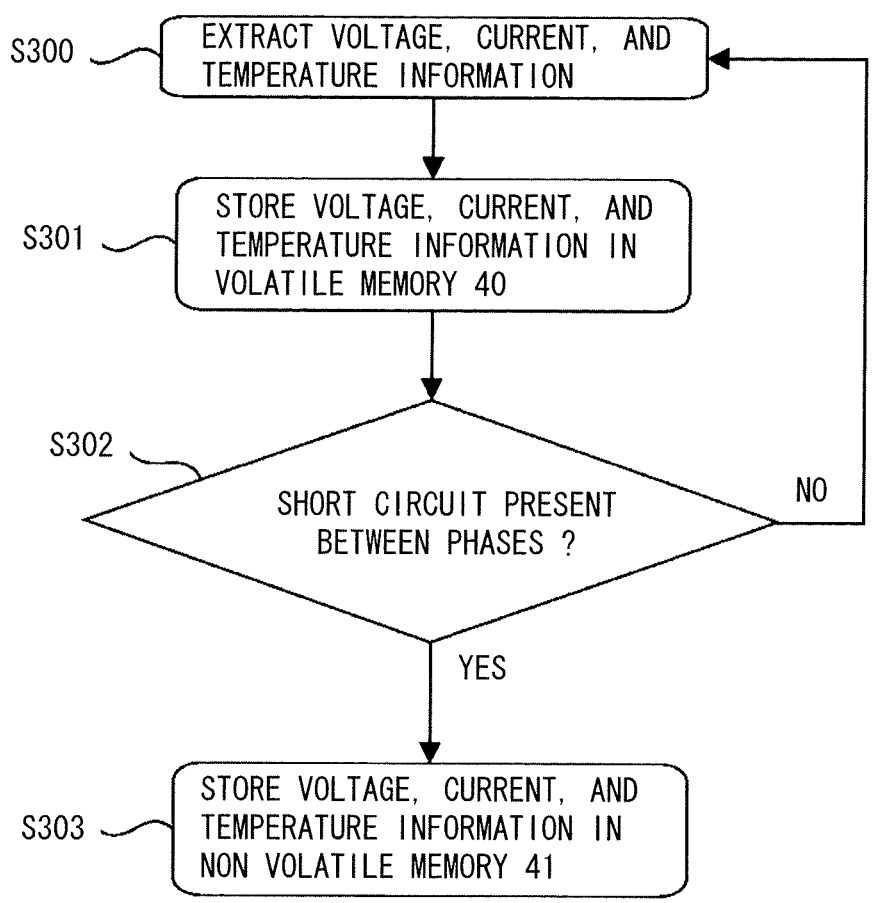
FIG. 18 is a flow chart related to abnormality information storage method, in the fifth embodiment employing the electric power conversion system/electric power conversion device according to the present invention.

FIG. 18 is a flow chart showing the processing up to the stage at which the abnormality information is stored in the non volatile memory 41. Information that is outputted by the abnormal current component determination device 30 is not only the abnormal current components; also the voltage values, the current values, and the temperatures of the switching elements for each phase and so on are outputted. In a step S301, these items of information are outputted to the volatile memory 40, and are stored in time series order. Next in a step S302 a decision is made as to whether or not short circuiting is taking place between any of the phases outputted by the abnormal current component detection device, and if there is no short circuiting between phases, then the flow of control returns to the step S300 and the storage to the volatile memory 40 of the voltage values, the current values, and the temperatures of the switching elements for each phase and so on continues as before. On the other hand, if there is any short circuiting between the phases, then the abnormal current component determination device 30 outputs a recording command signal to the volatile memory 40. And, on the basis of this recording command signal, the volatile memory 40 outputs to the non volatile memory 41 information such as the voltage values, the current values, and the temperatures of the switching elements for each phase and so on at the time point that the short circuiting between phases has occurred, and information such as the voltage values, the current values, and the temperatures of the switching elements for each phase and so on before and after that time point.

By storing and keeping this information in the non volatile memory 41, it becomes possible to analyze the situation at the moment that the determination of an abnormality was actually performed, and this can be taken advantage of during vehicle maintenance and so on.

It should be understood that the details stored in this non volatile memory 41 are not limited to being the voltage values, the current values, and the temperatures of the switching elements for each phase; information about various states in low load operating mode during the abnormality determination may be stored, as will be described hereinafter.

Moreover, while in this embodiment the volatile memory 40 and the non volatile memory 41 are provided within the control circuit 100, there would be no problem with the volatile memory 40 and the non volatile memory 41 being provided within a higher ranking controller 202. Recently it has become desirable to be able to trace the state of an HEV/EV system when and directly before an abnormality occurs by setting up cooperation with a driving recorder function that, in recent years, has also been provided to the vehicle.

The Sixth Embodiment

By extracting the high frequency components that are superimposed upon the motor current fundamental waves as shown in the first through the fifth embodiment, if a phase difference of approximately 180° is detected with any one of the embodiments, between the high frequency components of any of the two phases that have been extracted, so that it may be determined that a phase-to-phase insulation failure is occurring, then it is possible to continue driving of the motor by limiting the maximum value of the command value generated by the current command generation unit 4, provided that the amplitudes of the detected high frequency components do not exceed some predetermined value. On the other hand, if the amplitude of one or more of the detected high frequency components does exceed that predetermined value, then the operation of the motor may be stopped by stopping the current command from the higher ranking controller.

Figure 19:
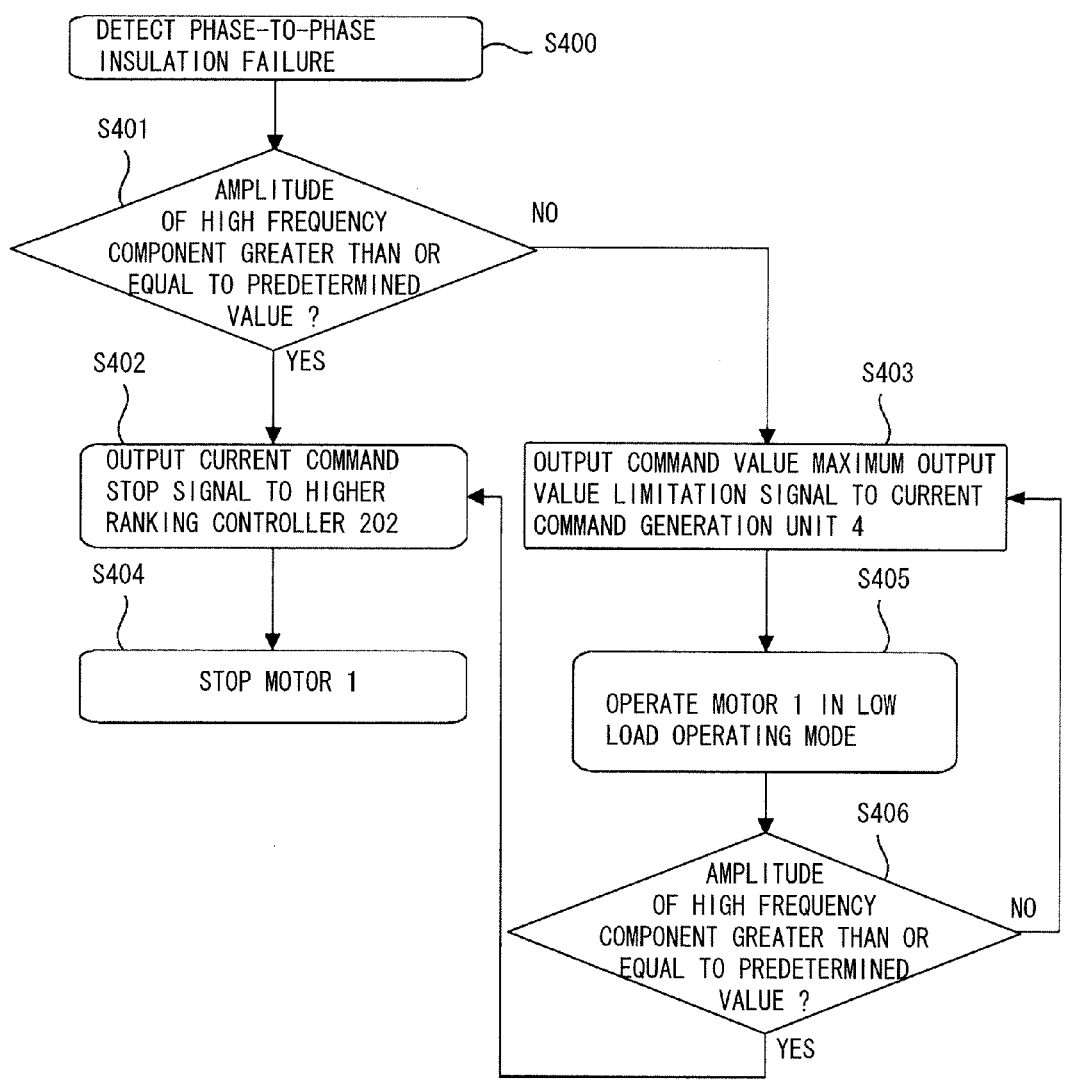
FIG. 19 is a flow chart related to changeover method of low load operating mode, in a sixth embodiment employing the electric power conversion system/electric power conversion device according to the present invention.

This control method will be explained in concrete terms with reference to FIG. 19. FIG. 19 is a flow chart for further processing if an insulation failure between phases has occurred. First, if the decision has been reached by the abnormal current component determination device 30 that an insulation failure between phases is occurring, then in a step S401 a decision is made as to whether or not the amplitude of the high frequency components is greater than or equal to a predetermined value. It should be understood that this predetermined value is a value that is different from the threshold value, and is a current value at which no problem arises with regard to safety during continuous operation of the vehicle. If it has been determined that the amplitude of the high frequency components is greater than or equal to the predetermined value, then the flow of control proceeds to a step S402, in which a current command stop signal is outputted from the control circuit to the higher ranking controller 202, so that the motor 1 stops. On the other hand, if it has been determined that the amplitude of the high frequency components is less than or equal to the predetermined value, then the abnormal current component determination unit 30 outputs to the current command generation unit 4 a maximum output value limitation signal that limits the maximum of the current command value that is outputted, and thereby limitation of the current outputted to the motor is performed. When operation is being performed in this manner in the mode in which the maximum current is limited (i.e. in the low load operating mode), then, as shown in the step S406, monitoring is continually performed as to whether or not the amplitudes of the high frequency components are greater than or equal to the predetermined value, and if the amplitude of one of the high frequency components has become greater than or equal to the predetermined value, then the flow of control is immediately transferred to the step S402, and operation of the motor is stopped.

Figure 10D:
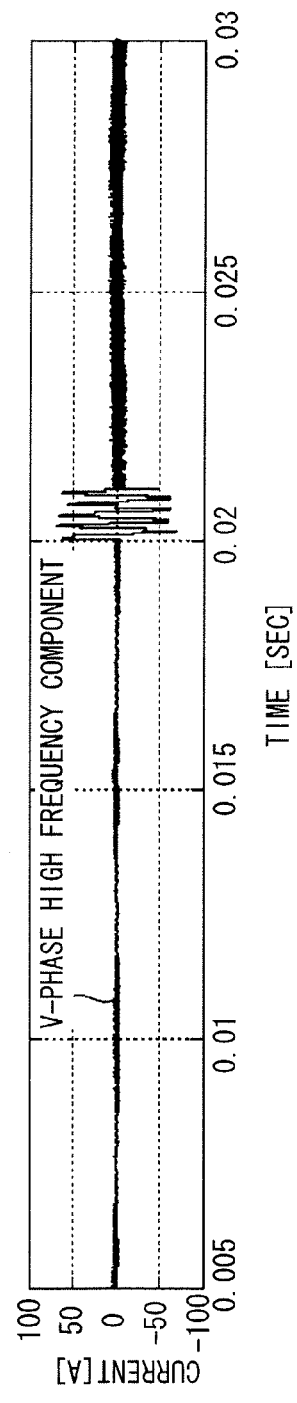
Figure 10E:
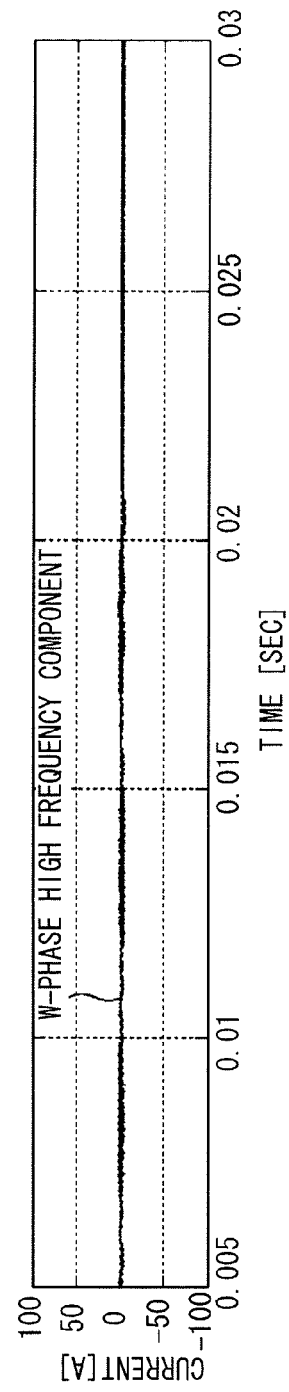

Moreover, the high frequency components that are superimposed upon the motor current fundamental waves during a phase-to-phase insulation failure are due to response of the control system accompanying change of impedance of the system, and it is possible to reduce the amplitudes of the high frequency components by reducing the gain of the current control system or by performing some adjustment such as changeover of the current controller or the like at the time point that a high frequency component is detected in the motor current fundamental wave so that it may be determined that there is an abnormality in the motor control circuit, and thus it is also possible to continue operation of the motor. FIG. 10 shows the simulation results when the gain of the current control system is changed over during abnormality detection. With the abnormality detection method of the present invention, along with determining that an abnormality is present in the motor control circuit at the time point that an abnormal current component superimposed upon the current fundamental wave is detected, also it is possible to suppress oscillations of the motor current during occurrence of short circuiting between phases by changing over the controller of the current control system to a smaller PI gain.

Figure 20:
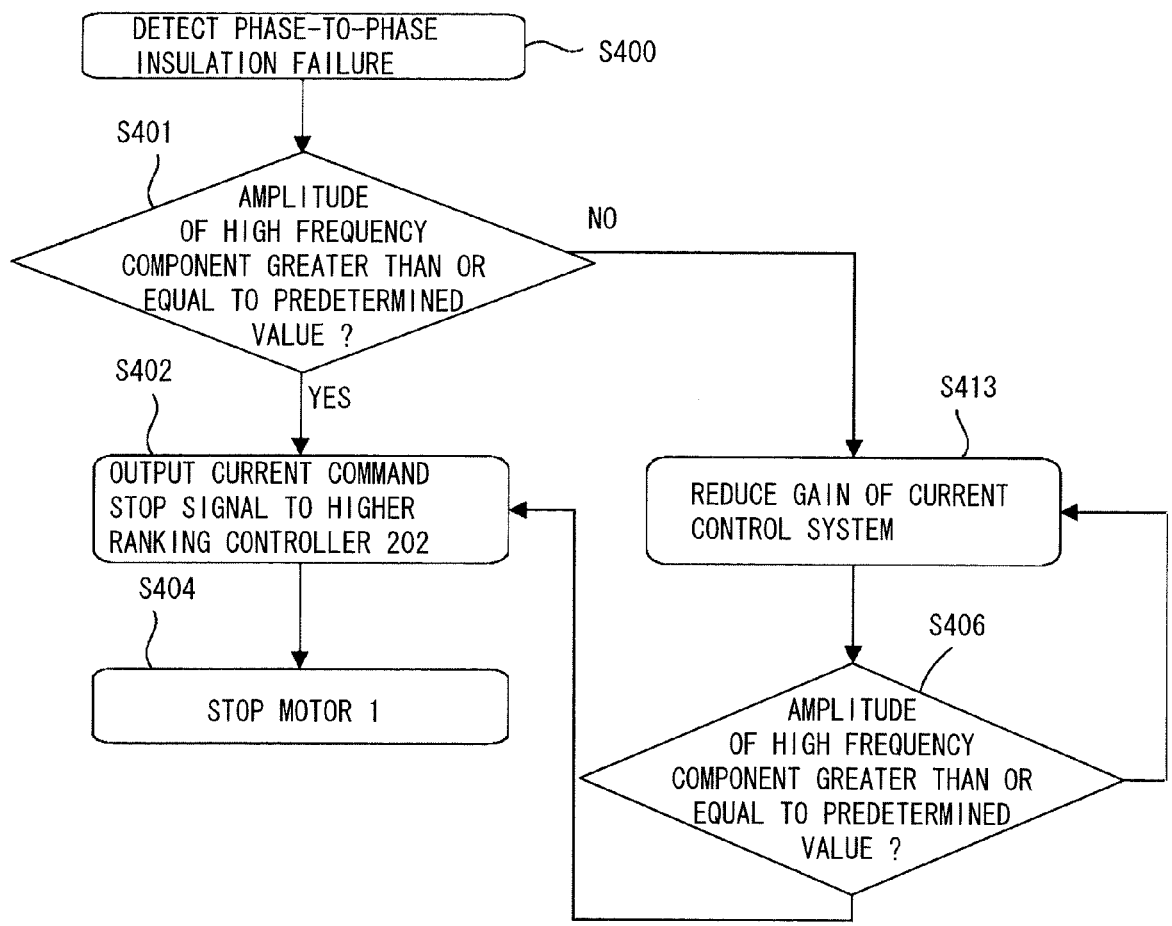
FIG. 20 is a flow chart related to gain changeover method of current control, in the sixth embodiment employing the electric power conversion system/electric power conversion device according to the present invention.

FIG. 20 is a flow chart showing the procedure when the gain of this current control system is to be reduced. Fundamentally this is the same as FIG. 19. The only feature of difference is that, instead of the step S403, a step S413 is employed.

Furthermore, in addition to the control method described above, when a phase difference of approximately 180° is detected between the high frequency components of two phases so that it is decided that a phase-to-phase insulation failure is occurring, a failure signal may be outputted by the abnormality detection unit, and a display may be provided upon an operating device or control device of the motor control device on the basis of this failure signal. For example, in the case of application to an electric automobile, by implementing illumination of a warning lamp upon an interior panel or the like, it is possible to notify the operator of the motor control device, or a maintenance operative, of the fact that a phase-to-phase insulation failure has taken place.

By employing the control method described above, it becomes possible to ensure the stability of operation of the motor without immediately stopping the motor, even if for example an insulation failure between phases has occurred.

By using any one of the first through the sixth embodiments described above, it is possible to discover short circuiting between phases at an early stage, and it becomes possible to prevent destruction of the inverter device, so that it becomes possible to supply an electrical power conversion device whose reliability is high. Moreover since it is still possible to continue operation of the motor without stopping it even when short circuiting between phases has been detected, accordingly it becomes possible to provide an electrical power conversion device whose reliability is high.

As far as the range of application of the present invention is concerned, apart from application to an automobile, an elevator, a compressor or the like to which an AC motor drive system is provided as cited as an example in the above description, it would also be possible to apply the present invention to a system that drives, not an AC motor, but a there phase AC inductive load device to which is supplied three phase AC current, and in general to a device in which such a system is employed.

The embodiments described above may be employed singly or in any combination. This is because it is possible to benefit from the advantageous effects of any of the embodiments either singly or in synergy. Moreover, the present invention is not to be considered as being limited by any of the features of the embodiments described above, provided that the essential characteristics of the present invention are not departed from.

What is claimed is:

1. An electrical power conversion system, comprising:
a motor;
an inverter circuit that outputs a U-phase current, a V-phase current, and a W-phase current to the motor;
a current sensor that detects the U-phase current, the V-phase current, and the W-phase current; and
a control circuit that controls the inverter circuit based on a torque command value and values detected by the current sensor, so that the U phase current, the V-phase current, and the W-phase current outputted from the inverter circuit are formed as sine waves; wherein:
the control circuit comprises:
 a current component extraction unit that, based on the values detected by the current sensor, for each phase, extracts high frequency current components superimposed upon the U-phase current, the V-phase current, and the W-phase current; and
 an AC current abnormality detection unit that detects an abnormality of an AC current flowing to the motor, based on the phases of the high frequency current components for any two phases among the U-phase current, the V-phase current, and the W-phase current;
the high frequency current components are components having a frequency that is higher than a fundamental frequency of the U-phase current, the V-phase current, and the W-phase current;
the current component extraction unit extracts the high frequency current components by determining differences between the values detected by the current sensor and three phase command currents that are calculated based on the torque command value; and
the AC current abnormality detection unit determines that there is an abnormality if a phase difference between the high frequency current components for any two phases among the U-phase current, the V-phase current, and the W-phase current is approximately 180°.

2. An electrical power conversion system according to claim 1, wherein the AC current abnormality detection unit determines that there is an abnormality in the AC current flowing to the motor, if an amplitude of any of the high frequency current components is greater than or equal to a threshold value.

3. An electrical power conversion system according to claim 2, wherein the AC current abnormality detection unit increases the threshold value when a rate of change of the torque command value is greater than a predetermined value.

4. An electrical power conversion system according to claim 2, wherein the AC current abnormality detection unit increases the threshold value when the motor rotational speed is greater than a predetermined value.

5. An electrical power conversion system according to claim 1, wherein:
the control circuit comprises a current command generation unit that, based on the torque command value, generates a current command less than or equal to a maximum current command value; and
the current command generation unit reduces the maximum current command value for the current command when it has been determined by the AC current abnormality detection unit that an abnormality has occurred.

6. An electrical power conversion system according to claim 1, wherein:
the control circuit comprises a current command generation unit that generates a current command based on the torque command value; and
the current command generation unit stops generation of the current command when it has been determined by the AC current abnormality detection unit that an abnormality has occurred.

7. An electrical power conversion system according to claim 1, wherein:
the control circuit comprises a volatile memory whose stored contents disappear when supply of power is terminated, and a non volatile memory whose stored contents are preserved even when supply of power is terminated;
the AC current abnormality detection unit outputs current information outputted to the motor to the volatile memory, and moreover outputs an abnormality signal to the volatile memory when it has been determined by the AC current abnormality detection unit that an abnormality has occurred; and
contents stored in the volatile memory are outputted to the non volatile memory when the abnormality signal is inputted.

8. An electrical power conversion device, comprising:
an inverter circuit that outputs a U-phase current, a V-phase current, and a W-phase current to a motor;
a current sensor that detects the U-phase current, the V-phase current, and the W-phase current; and
a control circuit that controls the inverter circuit based on a torque command value and values detected by the current sensor, so that the U-phase current, the V-phase current, and the W-phase current outputted from the inverter circuit are formed as sine waves; wherein:
the control circuit comprises:
a current component extraction unit that, based on the values detected by the current sensor, for each phase, extracts high frequency current components superimposed upon the U-phase current, the V-phase current, and the W-phase current; and
an AC current abnormality detection unit that detects an abnormality of an AC current flowing to the motor, based on the phases of the high frequency current components for any two phases among the U-phase current, the V-phase current, and the W-phase current;
the high frequency current components are components having a frequency that is higher than a fundamental frequency of the U-phase current, the V-phase current, and the W-phase current;
the current component extraction unit extracts the high frequency current components by determining differences between the values detected by the current sensor and three phase command currents that are calculated based on the torque command value; and
the AC current abnormality detection unit determines that there is an abnormality if a phase difference between the high frequency current components for any two phases among the U-phase current, the V-phase current, and the W-phase current, is approximately 180°.

9. An electrical power conversion device according to claim 8, wherein the AC current abnormality detection unit determines that there is an abnormality in the AC current flowing to the motor, if an amplitude of any of the high frequency current components is greater than or equal to a threshold value.

* * * * *